United States Patent
Choo et al.

(10) Patent No.: US 9,683,775 B2
(45) Date of Patent: Jun. 20, 2017

(54) REFRIGERATOR

(71) Applicant: LG ELECTRONICS INC., Seoul (KR)

(72) Inventors: Ayoung Choo, Seoul (KR); Jaeyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/336,166

(22) Filed: Oct. 27, 2016

(65) Prior Publication Data

US 2017/0045288 A1    Feb. 16, 2017

Related U.S. Application Data

(62) Division of application No. 14/821,306, filed on Aug. 7, 2015, now Pat. No. 9,513,048.

(30) Foreign Application Priority Data

Aug. 12, 2014 (KR) .................. 10-2014-0104157
Aug. 12, 2014 (KR) .................. 10-2014-0104212

(51) Int. Cl.
*A47B 96/04*    (2006.01)
*F25D 25/02*    (2006.01)
(Continued)

(52) U.S. Cl.
CPC ........... *F25D 25/024* (2013.01); *F16H 19/04* (2013.01); *F25D 11/02* (2013.01); *F25D 23/00* (2013.01);
(Continued)

(58) Field of Classification Search
CPC ...... F25D 25/02; F25D 25/024; F25D 25/027; F25D 23/00; F25D 23/067; F25D 11/02; F16H 19/04
See application file for complete search history.

(56) References Cited

U.S. PATENT DOCUMENTS 2,069,706 A    2/1937 Gerwig
2,106,506 A    1/1938 Pletcher
(Continued)

FOREIGN PATENT DOCUMENTS

CN    1648581    8/2005
CN    201497287   6/2010
(Continued)

OTHER PUBLICATIONS

European Search Report for Application EP 15 17 7091 dated Aug. 31, 2016.
(Continued)

*Primary Examiner* — Hanh V Tran
(74) *Attorney, Agent, or Firm* — KED & Associates, LLP

(57) ABSTRACT

A refrigerator may include guide members mounted to a storage chamber, with each guide member including a vertical guide hole and a vertical guide groove. A shelf may be mounted to the guide members, to be vertically movable, and switch members mounted to the shelf, to be movable forwards and rearwards. Each switch member may include a body, and a protrusion protruding from the body, to be guided along the guide groove of the corresponding guide member. A rotating shaft may be mounted beneath the shelf, to be guided along the guide holes. Pinions may be provided at the rotating shaft. Rack gears may be vertically mounted to the guide members, to be coupled to the pinions. A connecting device may transmit a force to vertically move a front half portion of the shelf to a rear half portion of the shelf such that the shelf is vertically movable while being maintained in a horizontal state.

16 Claims, 23 Drawing Sheets

(51) Int. Cl.
   *F25D 23/00*   (2006.01)
   *F16H 19/04*   (2006.01)
   *F25D 11/02*   (2006.01)
   *F25D 23/06*   (2006.01)
   *F25D 25/04*   (2006.01)

(52) U.S. Cl.
   CPC ........... *F25D 23/067* (2013.01); *F25D 25/02* (2013.01); *F25D 25/04* (2013.01)

(56) References Cited

U.S. PATENT DOCUMENTS

| | | | |
|---|---|---|---|
| 2,998,290 | A | 8/1961 | Sharpe |
| 3,188,161 | A | 6/1965 | Powder |
| 3,316,044 | A | 4/1967 | Carbary |
| 3,809,450 | A | 5/1974 | Guth |
| 4,217,010 | A | 8/1980 | Webb |
| 5,199,778 | A | 4/1993 | Aoki |
| 6,065,821 | A * | 5/2000 | Anderson .............. A47B 57/06 108/108 |
| 8,814,288 | B2 | 8/2014 | McDaniel |
| 8,936,333 | B2 | 1/2015 | Turner |
| 9,243,839 | B2 | 1/2016 | Kim |
| 9,372,027 | B2 * | 6/2016 | Yoo ......................... F25D 25/02 |
| 2001/0025508 | A1 * | 10/2001 | Nakajima .............. A47B 57/30 62/440 |
| 2008/0048081 | A1 * | 2/2008 | Costa .................... A47B 57/00 248/241 |
| 2008/0203041 | A1 | 8/2008 | Lim |
| 2008/0246382 | A1 | 10/2008 | Kang et al. |
| 2008/0263819 | A1 | 10/2008 | Tomioka |
| 2009/0058247 | A1 | 3/2009 | Collins |
| 2009/0121600 | A1 | 5/2009 | Eisele |
| 2010/0066227 | A1 | 3/2010 | Ramm |
| 2010/0176704 | A1 | 7/2010 | Kim |
| 2011/0031863 | A1 | 2/2011 | Benitsch |
| 2013/0081421 | A1 | 4/2013 | Kwon et al. |

FOREIGN PATENT DOCUMENTS

| | | |
|---|---|---|
| CN | 202547255 | 11/2012 |
| CN | 202582028 | 12/2012 |
| CN | 103375962 | 10/2013 |
| DE | 102010030580 | 12/2011 |
| EP | 2 250 928 | 11/2010 |
| EP | 2 489 967 | 8/2012 |
| JP | 2001-231647 | 8/2001 |
| KR | 10-0149926 | 6/1998 |
| KR | 10-2006-0040290 | 5/2006 |
| KR | 10-2008-0090875 | 10/2008 |
| KR | 10-2009-0125317 | 12/2009 |
| KR | 10-2010-0128099 | 12/2010 |
| KR | 20-0468206 | 8/2013 |
| WO | WO 2013/098257 | 7/2013 |

OTHER PUBLICATIONS

European Search Report for Application 15177091.4 dated Mar. 24, 2016.

U.S. Office Action for parent U.S. Appl. No. 14/821,306 dated Apr. 13, 2015.

* cited by examiner

REFRIGERATOR

This application is a Divisional Application of prior U.S. patent application Ser. No. 14/821,306 filed Aug. 7, 2015, which claims priority under 35 U.S.C. §119 to Korean Patent Application Nos. 10-2014-0104157 and 10-2014-0104212, filed on Aug. 12, 2014, whose entire subject matters are hereby incorporated by reference.

BACKGROUND

1. Field

Embodiments may relate to a refrigerator, and more particularly to a refrigerator capable of easily moving a shelf mounted to a storage chamber without separation of the shelf.

2. Background

A refrigerator is an appliance for storing food, etc. within a storage chamber in a frozen or refrigerated state by discharging, into the storage chamber, cold air generated through a refrigeration cycle constituted by a compressor, a condenser, an expansion valve, an evaporator, etc.

Such a refrigerator includes, as storage compartments, a freezing compartment for storing food or beverages in a frozen state, and a refrigerating compartment for storing food or beverages at low temperature.

At least one of plural doors installed at a refrigerator is connected to one side of a body by a hinge, to open or close a front side of the body through pivotal movement thereof. In addition to such a door, which pivots about a hinge, a drawer type door may also be provided. The drawer type door may include a drawer, and a door mounted to a front side of the drawer, to be withdrawn or retracted in a forward or rearward direction, along with the drawer.

Storage compartments of a refrigerator (i.e., freezing and refrigerating compartments) are provided with a plurality of shelves to vertically divide the freezing and refrigerating compartments into sections, in order to store food articles having various sizes and to enhance space utilization.

Since food articles to be placed on such shelves may have various sizes, the shelves may be separably mounted at different levels in the freezing and refrigerating compartments while being movable to adjust mounting levels thereof.

Mounting of the shelves may be achieved by slidably mounting the shelves to a plurality of support ribs formed at left and right surfaces of the refrigerating and freezing compartments, or coupling a pair of cantilevers coupled to each shelf, and then mounting the cantilevers to mounting rails each formed with a plurality of vertically arranged holes.

However, level adjustment of shelves may be difficult and troublesome because, when it is desired to adjust the mounting level of a shelf, the user has to separate the shelf from the support ribs or mounting rails after completely removing food articles from the shelf, and then to mount the separated shelf to another level.

A structure capable of adjusting the level of a shelf while food is placed thereon is disclosed in Korean Unexamined Patent Publication No. 10-2006-0040290, the subject matter of which is incorporated herein by reference.

However, the structure may have a problem in that, when it is desired to adjust the level of a shelf, the user may have to move the shelf along an inclined guide slot in forward and rearward directions by a long distance. Furthermore, the shelf should be moved between an initial position and a final position by a considerable distance.

There may be a danger in that, when the shelf is used under a condition that the shelf is disposed at an upper position thereof, and food articles are placed on the shelf, the shelf may be moved to a lower position thereof along the guide slot.

Furthermore, the shelf may be inclined in a forward or rearward direction or in a left or right direction during vertical movement thereof, without being kept in a horizontal state. As a result, there may be a problem in that movement of the shelf becomes difficult, or food articles placed on the shelf may fall.

BRIEF DESCRIPTION OF THE DRAWINGS

Arrangements and embodiments may be described in detail with reference to the following drawings in which like reference numerals refer to like elements wherein.

DETAILED DESCRIPTION

Reference may now be made in detail to preferred embodiments of the present disclosure, examples of which are illustrated in the accompanying drawings.

Figure 1:
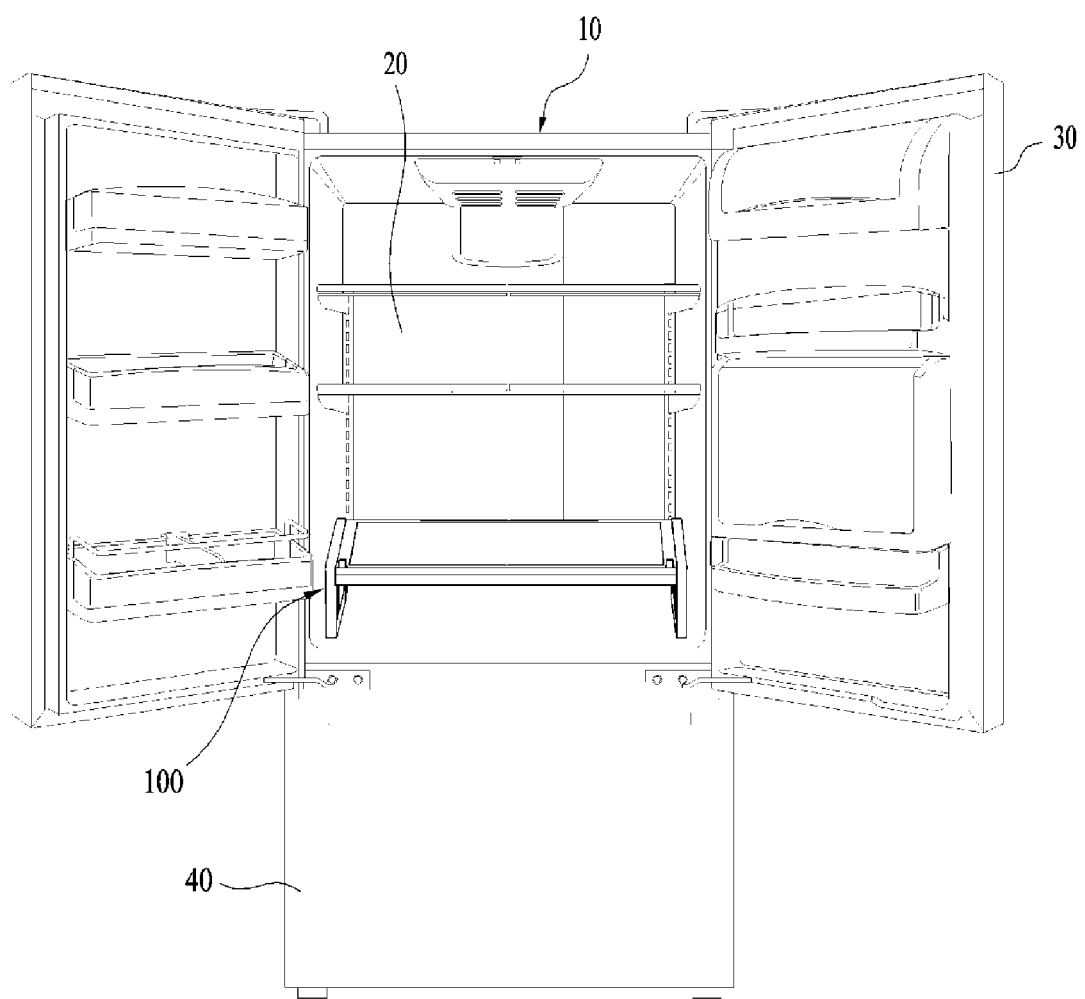
FIG. 1 is a perspective view illustrating a refrigerator according to an embodiment.

FIG. 1 is a perspective view illustrating a bottom freezer type refrigerator equipped with a shelf assembly in accordance with an embodiment.

The refrigerator may include a cabinet 10 defined with a storage chamber therein, and a shelf assembly 100 mounted in the storage chamber, to be vertically movable.

The illustrated refrigerator is a bottom freezer type refrigerator in which a refrigerating compartment 20 may be provided at a top side of the cabinet 10, and a freezing compartment may be provided at a bottom side of the cabinet 10. However, embodiments may also be applied to refrigerators of other types, so long as the shelf assembly 100 is mountable in a storage chamber such as a refrigerating compartment or a freezing compartment.

Refrigerators of other types may include a side-by-side type refrigerator in which a freezing compartment and a refrigerating compartment are laterally arranged, and a top mounting type refrigerator in which a freezing compartment is arranged over a refrigerating compartment.

Additionally, embodiments may be applied to a refrigerator including a refrigerating compartment or a freezing compartment alone, so long as the shelf assembly 100 is mountable in the storage chamber.

The shelf assembly 100 may mainly be mounted in a refrigerating compartment. The shelf assembly 100 may also be mounted to a freezing compartment.

The refrigerating compartment 20 provided at the top side of the cabinet 10 may be opened or closed by a pair of pivotally-mounted refrigerating compartment doors 30.

The freezing compartment provided at the bottom side of the cabinet 10 may be opened or closed by a freezing compartment door 40, which is a drawer type door. The freezing compartment door 40 may be a pivotally-mounted door, in place of the drawer type door.

The shelf assembly 100 may mainly be mounted in a lower portion of the refrigerating compartment 20, and may include a vertically movable shelf. The shelf assembly 100 may further include at least one shelf separably mounted on the shelf assembly 100.

As shown in FIG. 1, the shelf mounted on the shelf assembly 100 may be supported by cantilevers. Otherwise, this shelf may be supported by shelf support ribs provided at inner side surfaces of the refrigerating compartment 20.

Hereinafter, a shelf assembly according to a first embodiment may be described with reference to FIGS. 2 to 8.

Figure 2:
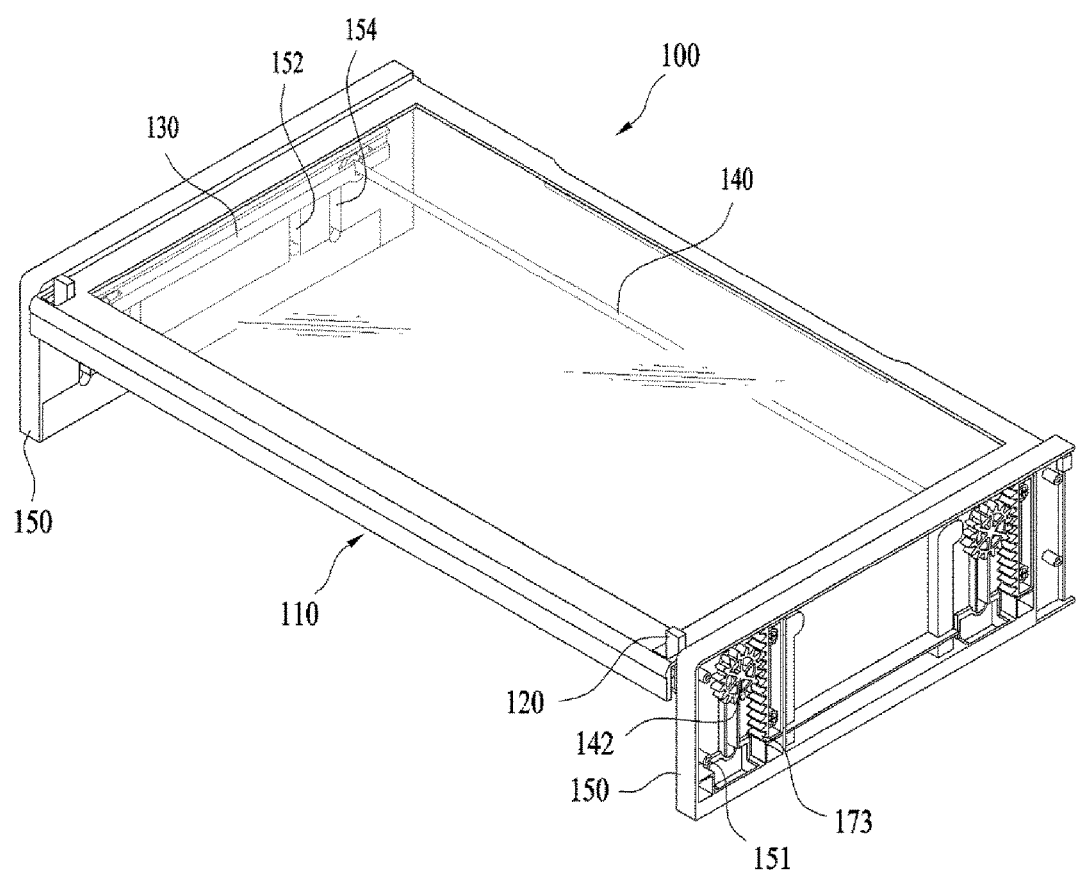
FIG. 2 is a perspective view illustrating a shelf assembly according to a first embodiment.
Figure 3:
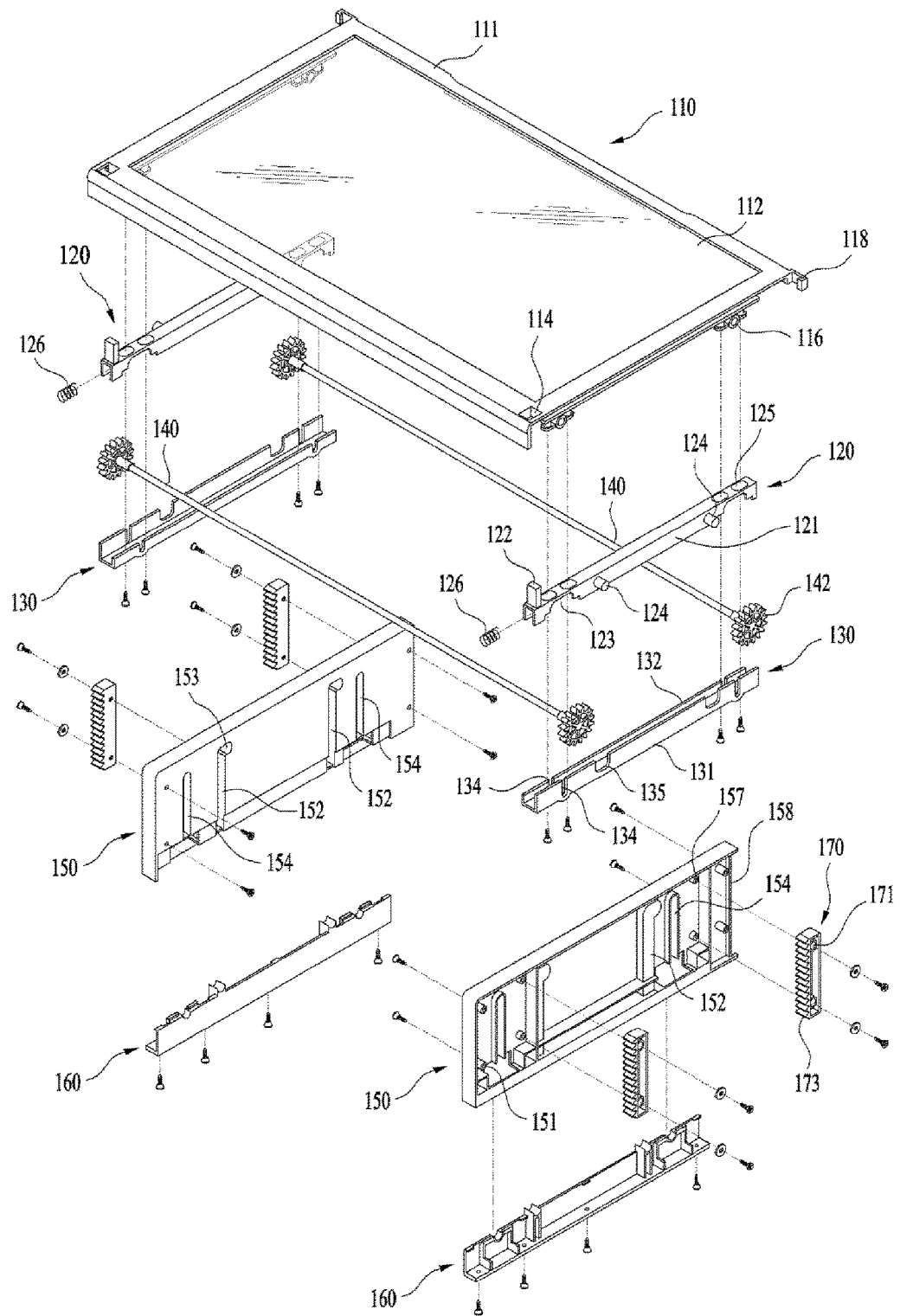
FIG. 3 is an exploded perspective view corresponding to FIG. 2.
Figure 4:
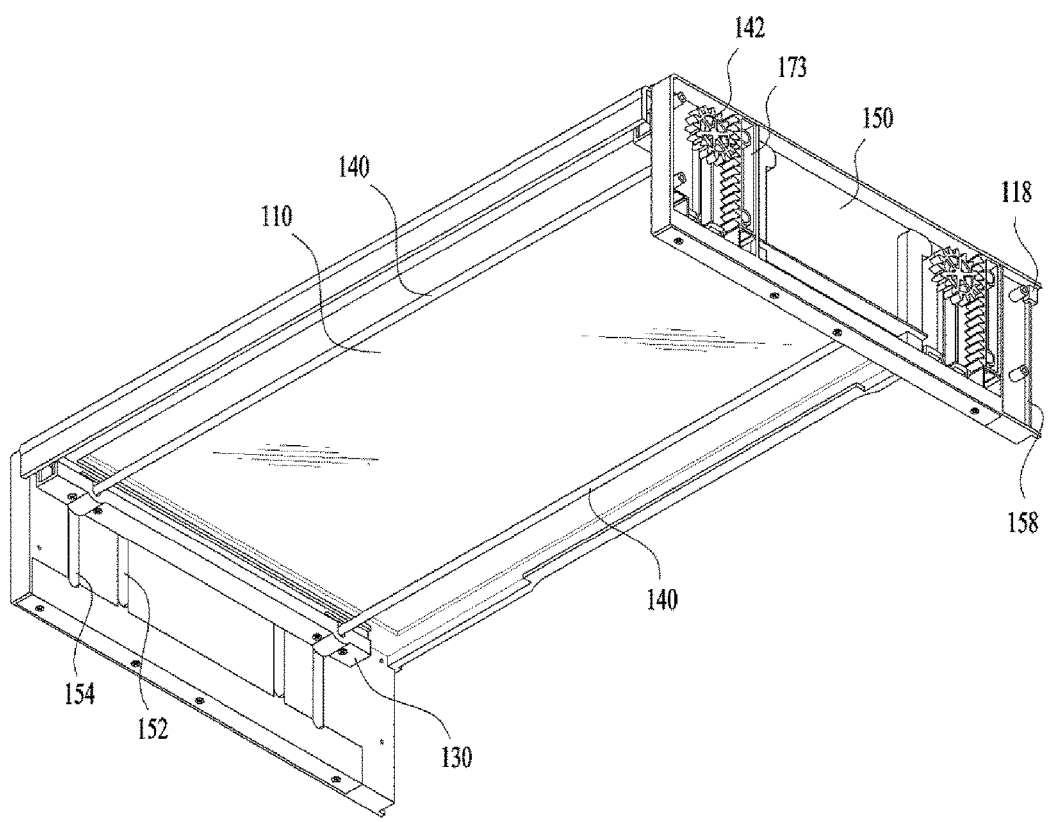
FIG. 4 is a perspective bottom view of the shelf assembly illustrated in FIG. 2.

FIG. 2 is a perspective view illustrating the shelf assembly according to the first embodiment. FIG. 3 is an exploded perspective view corresponding to FIG. 2. FIG. 4 is a perspective bottom view of the shelf assembly illustrated in FIG. 2.

The shelf assembly 100 may be installed at a storage chamber, (i.e., a refrigerating compartment 20 or a freezing compartment). The following description will be given in conjunction with an example in which the shelf assembly 100 is installed at the refrigerating compartment 20.

The shelf assembly 100 according to the illustrated embodiment may include a pair of guide members 150 respectively mounted to opposite inner side surfaces of the refrigerating compartment 20, and a shelf 110 supported between the guide members 150, to be vertically movable.

Mounting of the guide members 150 may be achieved by fastening screws to the inner side surfaces of the refrigerating compartment 20 through bosses 151 provided at upper and lower portions of front and rear ends of the guide members 150.

Each guide member 150 may include a guide slot 154 formed through the guide member 150 to be vertically elongate, and a guide groove 152 formed at an inner surface of the guide member 150 to extend vertically.

A pair of guide slots 154 (i.e., the guide slots 154 of the guide members 150) may be arranged to receive a rotating shaft 140, which may be described below. The guide grooves 152 may receive protrusions 124 of the switch members 120, which will be described later. The protrusions 124, which are inserted into the corresponding guide grooves 152, may be guided by the corresponding guide grooves 152, respectively.

The shelf 110 may have a rectangular shape, and may include a frame 111 formed with a rectangular opening therein, and a plate 112 coupled to the opening of the frame 111.

The plate 112 may be made of a transparent or semitransparent material, to enable the user to view articles disposed beneath the shelf 110.

The plate 112 may be made of transparent or semitransparent plastic or reinforced glass.

A pair of switch members 120 may be provided at opposite sides of the shelf 110, respectively. The switch members 120 may be locked at an upper position where the switch members 120 support the shelf 110 such that the shelf 110 is maintained at the upper position and may be operated by the user, to be unlocked such that the switch members 120 are movable downwards.

Each switch member 120 may include a body 121 formed to be elongate in forward and rearward directions. The bodies 121 of the switch members 120 may be mounted to lower surfaces of opposite side portions of the frame 111, respectively, to be slidably movable in forward and rearward directions by a certain distance.

In each switch member 120, the protrusion 124 may be formed at an outer surface of the body 121, to be inserted into and guided by the guide groove 152 of the corresponding guide member 150.

The guide groove 152 may support the protrusion 124 when the protrusion 124 is positioned at an upper end of the guide groove 152, to maintain the shelf 110 at the upper position.

The guide groove 152 may preferably include a vertical portion formed at an inner surface of the guide member 150 to a certain depth while being vertically elongate, and a horizontal portion 153 formed at an upper end of the vertical portion, to extend horizontally. The vertical portion may be designated by reference numeral "152" designating the guide groove.

When the shelf 110 is at the upper position, the protrusion 124 may be supported by the horizontal portion 153. On the other hand, when the shelf 110 is positioned at a lower position, the protrusion 124 may be supported by a lower end of the guide groove 152.

Since the guide groove 152 is vertically elongate, the guide groove 152 may guide vertical movement of the protrusion 124, and may prevent the shelf 110 from moving in a horizontal direction.

The rotating shaft 140 may be rotatably mounted to a lower surface of the shelf 110, to be guided along the guide slots 154 of the guide members 150.

Pinions 142 may be coupled to opposite ends of the rotating shaft 140, to rotate together when the rotating shaft 140.

Since the opposite ends of the rotating shaft 140 extend through the corresponding guide slots 154 of the guide members 150, respectively, the pinions 142 may be arranged at the outer surfaces of the guide members 150, respectively.

Rack gears 173 may be provided at the outer surfaces of the guide members 150, to extend vertically. The rack gears 173 may be coupled to the corresponding pinions 142 of the guide members 150, respectively.

The pinions 142 may be vertically moved along the rack gears 173 mounted in a vertical direction while rotating, together with the rotating shaft 140.

Since the pinions 142 are provided in pair at opposite ends of the rotating shaft 140 and are simultaneously moved in a vertical direction while rotating together with the rotating shaft 140, the shelf 110, to which the rotating shaft 140 is mounted, may be maintained in a horizontal state without being laterally inclined during vertical movement thereof.

Although the rack gears 173 may be formed integrally with the corresponding guide members 150 at the outer surfaces of the guide members 150, manufacture thereof may be difficult due to complexity of structure. For this reason, separate shelf members 170 may preferably be prepared and coupled to the guide members 150.

Each shelf member 170 may be formed, at a rear surface thereof, with a shelf, namely, the rack gear 173, and may be provided with a plurality of bosses 171, through which screws can pass for coupling of the shelf member 170 to the corresponding guide member 150.

Bosses 157 corresponding to respective bosses 171 of the shelf member 170 may also be provided at the outer surface of the guide member 150, to enable the shelf member 170 to be fastened to the guide member 150 by screws.

Additionally, in order to maintain the shelf 110 in a horizontal state without being inclined in forward and rearward directions during movement thereof, the refrigerator may further include a connecting device for transmitting force to vertically move a front half portion of the shelf 110 to a rear half portion of the shelf 110.

In the first embodiment, the connecting device may include another protrusion 124 provided at a rear portion of the body 121 of each switch member 120, and another guide groove 152 formed at the inner surface of the guide member 150 corresponding to the switch member 120, to guide and support the protrusion 124.

The protrusion 124 provided at the front side of the outer surface of the switch member 120 may be referred to as a first protrusion, and the protrusion 124 provided at the rear side of the outer surface of the switch member 120 may be referred to as a second protrusion.

The guide groove 152 provided at the front side of the inner surface of the guide member 150 may be referred to as a first guide groove, and the guide groove 152 provided at the rear side of the inner surface of the guide member 150 may be referred to as a second guide groove.

The body 121 of the switch member 120 may be elongate to have a length approximate to the length of the shelf 110 in forward and rearward directions. A pair of protrusions, namely, the protrusions 124, may be arranged at the front and rear sides of the outer surface of the body 121, while being spaced by a predetermined distance.

The distance between the pair of protrusions 124 may be equal to the distance between the pair of guide grooves 152 formed at positions corresponding to those of the protrusions 124, and the pair of protrusions 124 can move in a vertical direction only in a state in which the protrusions 124 are maintained at the same level.

Thus, since the protrusions 124 are maintained in a horizontal state, the shelf 110 supported by the switch members 120 may be vertically moved while maintaining in a horizontal state without being inclined in forward and rearward directions.

Guide brackets 130 may preferably be provided at the lower surfaces of the opposite lateral ends of the shelf 110, to support the switch members 120 while allowing the switch members 120 to be slidable in forward and rearward directions.

The guide brackets 130 may be fastened to the lower surfaces of the opposite side portions of the frame 111 included in the shelf 110 by a plurality of screws.

Although the lower portion of the frame 111 of the shelf 110 may enclose the switch members 120, to slidably support the switch members 120, the structure of the frame 111 (of the shelf 110) may be complicated. In this case, it may be difficult to mold the frame 111 of the shelf 110.

Therefore, separate members such as the guide brackets 130 may preferably be prepared, and fastened to the lower surfaces of the opposite side portions of the shelf 110.

Each guide bracket 130 may be opened upwards to enclose the corresponding switch member 120 at the bottom side thereof, and may have a U-shaped cross-section.

That is, the guide bracket 130 may include a bottom portion having an elongate rectangular plate shape, and a pair of side portions 131 and 132 extending upwards from opposite ends of the bottom portion.

Since an outer one of the side portions 131 and 132, (i.e., the side portion 131) is disposed at a corresponding side surface of the shelf 110, the outer side portion 131 may be formed to be longer than the inner side portion 132, which is disposed at the lower surface of the shelf 110.

Bearing grooves 134 may be provided at the outer and inner side portions 131 and 132 of each guide bracket 130. The bearing grooves 134 may function as bearings to support the rotating shaft 140.

The bearing grooves 134 of the outer and inner side portions 131 and 132 may have the same bottom level. Two bearing grooves 134 may be provided at each of the left and right guide brackets 130 such that the two bearing grooves 134 of the left guide bracket 130 are symmetrical with the two bearing grooves 134 of the right guide bracket 130. Accordingly, the rotating shaft 140 may be horizontally supported by a total of four bearing grooves 134.

A protrusion movement groove 135 may be formed at the outer side portion 131 of each guide bracket 130 at a position corresponding to a position of each protrusion 124 defined when the switch member 120 corresponding to the guide bracket 130 is mounted. The protrusion movement groove 135 may allow movement of the protrusion 124 in forward and rearward directions.

The protrusion movement groove 135 may have a considerably greater horizontal width than the bearing grooves 134 because the protrusion 124 moves in forward and rearward directions.

Since two protrusions 124 are provided at the outer surface of the switch member 120, the guide bracket 130 may also be provided with two protrusion movement grooves 135 respectively corresponding to the two protrusions 124 at two positions of the outer side portion 131 of the guide bracket 130.

Rotating shaft mounting members 116 may be provided at the lower surfaces of the opposite side portions of the frame 111 included in the shelf 110, to support the rotating shaft 140 under the condition that the rotating shaft 140 is inserted into the rotating shaft mounting members 116.

Although the rotating shaft mounting members 116 may be provided at the frame 111 while being integrated with the lower surface of the frame 111, it may be difficult to form the rotating shaft mounting members 116 integrally with the frame 111 because the rotating shaft 140 is mounted to the rotating shaft mounting members 116 in an inserted state. Accordingly, for the rotating shaft mounting members 116, separate members may preferably be prepared and coupled to the lower surface of the frame 111.

Two bosses may be integrally provided at the lower surface of the frame 111, to enable each rotating shaft mounting member 116 to be fastened to the frame 111 by two screws.

Upon mounting the rotating shaft mounting member 116, the two screws may preferably be fastened to the two bosses after passing through the corresponding guide bracket 130 under the condition that the corresponding switch member 120 is interposed between the frame 111 and the guide bracket 130.

To this end, two slots 125 may be formed at a top portion of the switch member 120, to allow the switch member 120 to move in forward and rearward directions under the condition that the two bosses of the rotating shaft mounting member 116 are inserted into the two slots 125, respectively.

Additionally, the body 121 of the switch member 120 may be provided, at opposite side portions thereof, with grooves 123 formed at positions corresponding to the rotating shaft mounting member 116.

The grooves 123 may be formed to allow the switch member 120 to move in forward and rearward directions with respect to the rotating shaft mounting member 116.

A switch 122 protruding upwards may be provided at an upper surface of a front end of each switch member 120. The switch 122 may pass through a switch hole 114 formed at a corresponding one of the opposite ends of the front portion of the shelf 110 such that the switch 122 protrudes upwards beyond the upper surface of the shelf 110.

Since the switch 122 is moved in forward and rearward directions together with the switch member 120, the switch hole 114 may be formed to allow the switch 122 to move a predetermined distance.

The user may release a locked state of the switch member 120, at which the shelf 110 is locked at the upper position, by pulling the switch 122 in a forward direction. The switch member 120 may include an elastic member 126 for restoring the switch member 120 to an original position thereof after movement thereof.

The elastic member 126 may be mounted between a front surface of the switching member 120 and a front inner surface of the shelf 110, and may provide a restoring force to push the switch member 120 in a rearward direction.

Figure 5A:
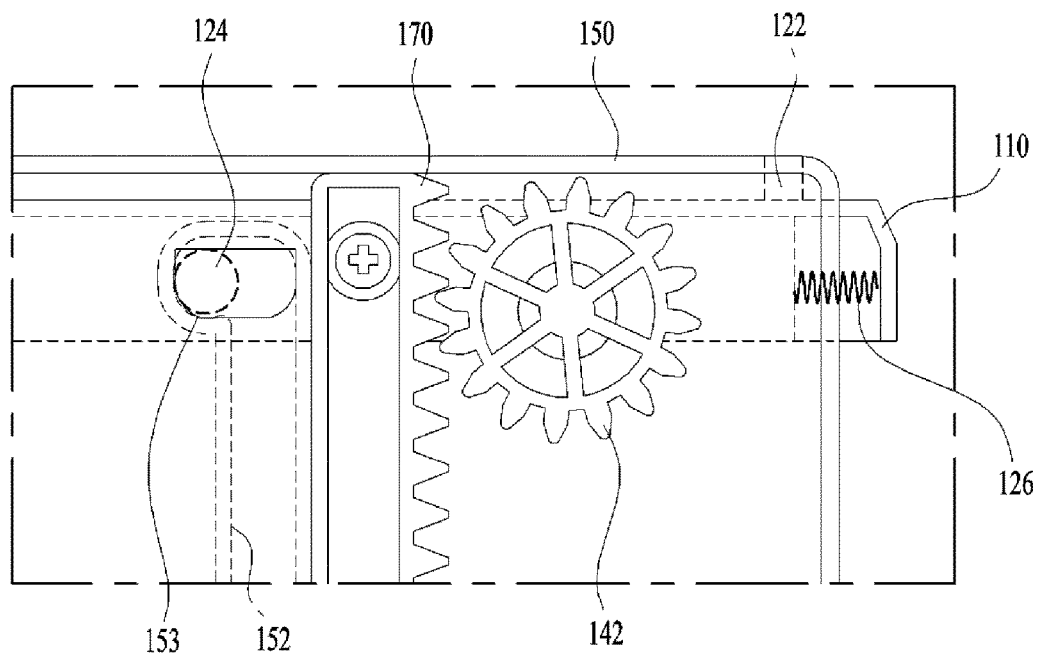
FIGS. 5A and 5B are left side views illustrating operation of a switch member.

As shown in FIG. 5A, when the shelf 110 is positioned at the upper position, the elastic member 126 may push the switch member 120 such that the protrusions 124 of the switch member 120 are maintained in a state of being supported by the horizontal portions 153 of the corresponding guide grooves 152, respectively.

Figure 5B:
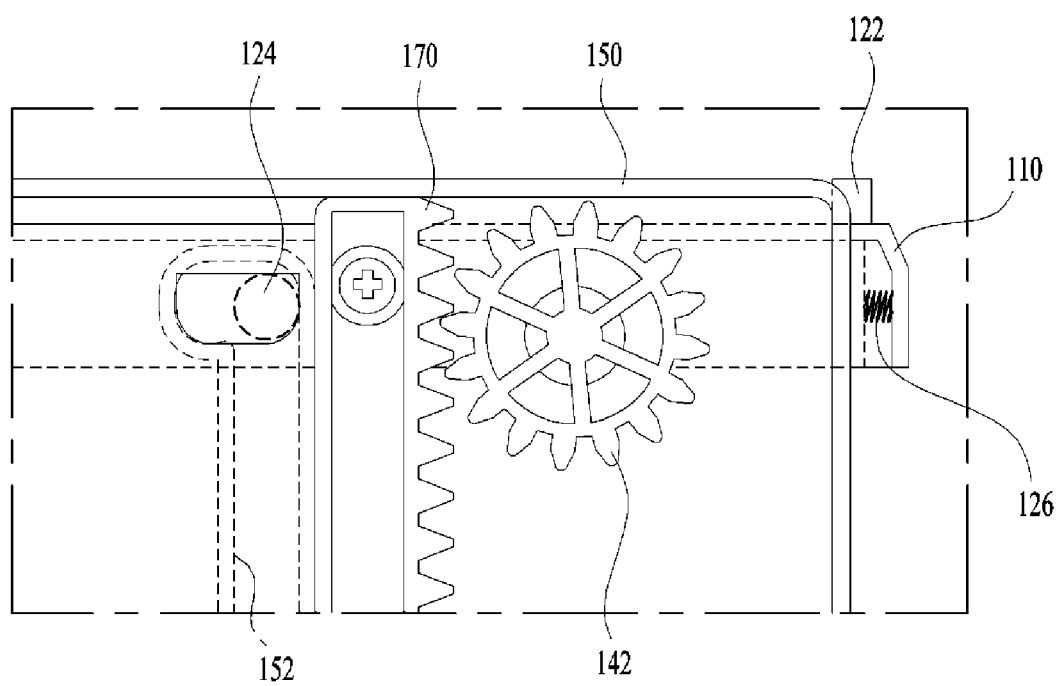

When the user pulls the switch 122, the switch member 120 may compress the elastic member 126 while moving, as shown in FIG. 5B, and the protrusions 124 may be moved from the horizontal portions 153 to the vertical portions 152 connected to the horizontal portions 153. Accordingly, the shelf 110 may be moved in a downward direction.

Since a pair of switch members 120 are provided at opposite sides of the shelf 110, the user may move the shelf 110 in a downward direction after releasing the locked state of the shelf 110 at the upper position by pulling both of the switches 122.

When the user moves the shelf 110 in a downward direction while supporting lower surfaces of opposite side portions of the shelf 110, the opposite pinions 142 of the rotating shaft 140 may move along the corresponding rack gears 173 provided at the outer surfaces of the guide members 150 while rotating, and the horizontal state of the shelf 110 in left and right directions is maintained. At the same time, each protrusion 124 of each switch member 120 may be guided by the corresponding guide groove 152, and the horizontal state of the shelf 110 in forward and rearward directions is maintained.

Another rotating shaft 140, additional pinions 142, additional guide slots 154, and additional rack gears 173 may also be provided beneath the shelf 110 at the rear side of the shelf 110, in addition to those provided at the front side of the shelf 110.

Thus, two rotating shafts 140, four pinions 142, four guide slots 154, and four rack gears 173 may be mounted.

For mounting of the two rotating shafts 140, a total of four rotating shaft mounting members 116 may be mounted to the lower surface of the shelf 110 at front, rear, left and right sides of the shelf 110.

A pair of pinions 142 may be coupled to opposite ends of the rear rotating shaft 140, as in the front rotating shaft 140. The rear rotating shaft 140 may extend through the guide slots 154 formed at the rear sides of the guide members 150, and the pinions 142 may be mounted to opposite ends of the rear rotating shaft 140 at the outside of the guide member 150, and may be coupled to the rack gears 173 of the shelf member 170 mounted to the outer surfaces of the guide members 150.

Additional bearing grooves 134 may also be provided at the rear side of each guide bracket 130, to receive and support the rear rotating shaft 140.

Additional grooves 123 and additional slots 125 may also be provided at opposite side portions of each switch member 120 at the rear side of the switch member 120, similarly to those at the front side of the switch member 120.

In the shelf assembly, not only the front half portion of the shelf 110, but also the rear half portion of the shelf 110 may vertically move while maintaining a horizontal state in left and right directions because respective rotating shafts 140 are provided beneath the shelf 110 at front and rear sides of the shelf 110.

Even when only one rotating shaft 140 is provided at the front side of the shelf 110, the two protrusions 124 provided at each switch member 120 may be guided by the corresponding guide grooves 152 while preventing the shelf 110 from being inclined in forward and rearward directions. Accordingly, although only the horizontal state of the front half portion of the shelf 110 in left and right directions is maintained, the horizontal state of the rear half portion of the shelf 110 in left and right directions may also be maintained.

Figure 6:
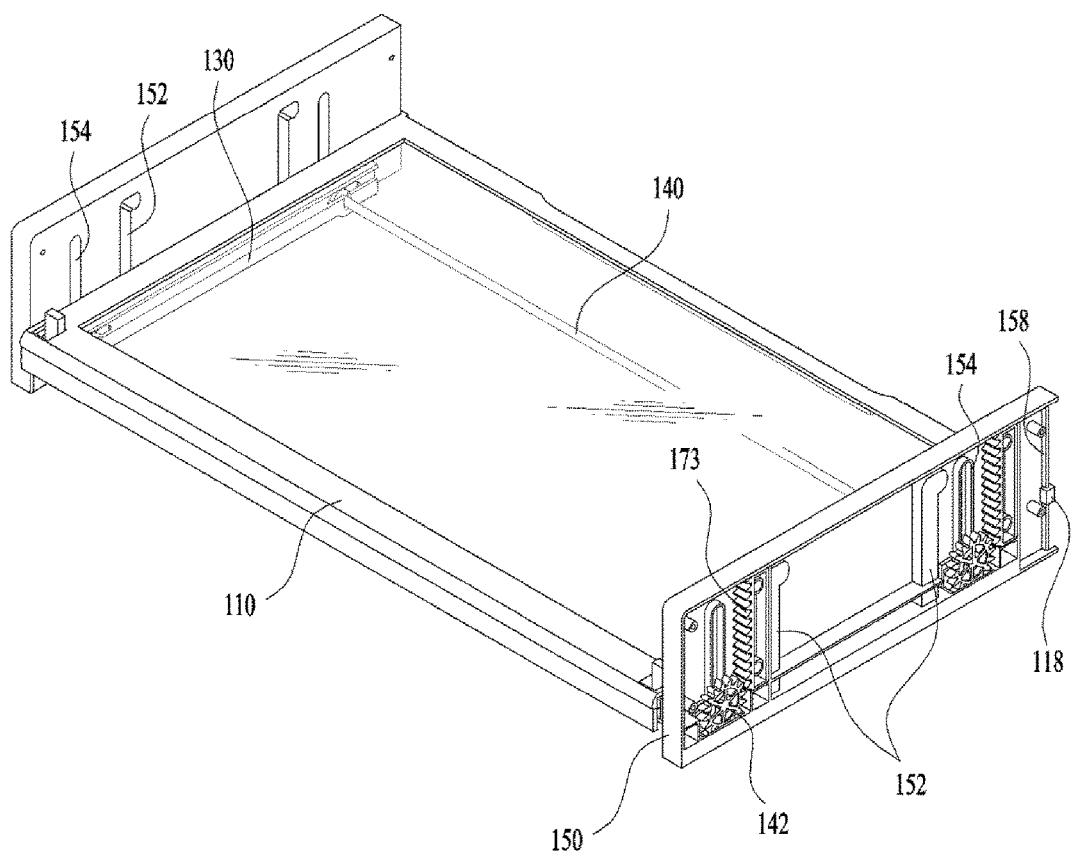
FIG. 6 is a perspective view illustrating a state in which the shelf assembly of FIG. 2 has been moved downwards to a lower position.

FIG. 6 illustrates a state in which the shelf 110 has been moved downwards to a lower position.

When the shelf 110 is at the lower position, the rotating shaft 140 may be supported by the lower ends of the guide slots 154. The protrusions 124 may be supported by the lower ends of the guide grooves 152, respectively.

The guide members 150 may further include guide ribs 158 provided at respective rear ends of the guide members 150, to be vertically elongate. In this case, the shelf 110 may further include guide protrusions 118 formed at opposite sides of the rear end of the shelf 110 to be slidable along the guide ribs 158 while enclosing the guide ribs 158, respectively.

Each guide rib 158 may be formed to protrude from the rear end of the corresponding guide member 150 in an outward direction, but may not protrude outside the outer surface of the guide member 150 when the corresponding guide protrusion 118 is mounted to enclose the guide rib 158.

Accordingly, when the guide member 150 is mounted to the refrigerating compartment 20, the guide protrusion 118 may be hidden.

The guide rib 158 may guide vertical movement of the shelf 110, and may guide vertical movement of the shelf 110, along with the guide grooves 152 and the guide slots 154.

Figure 7:
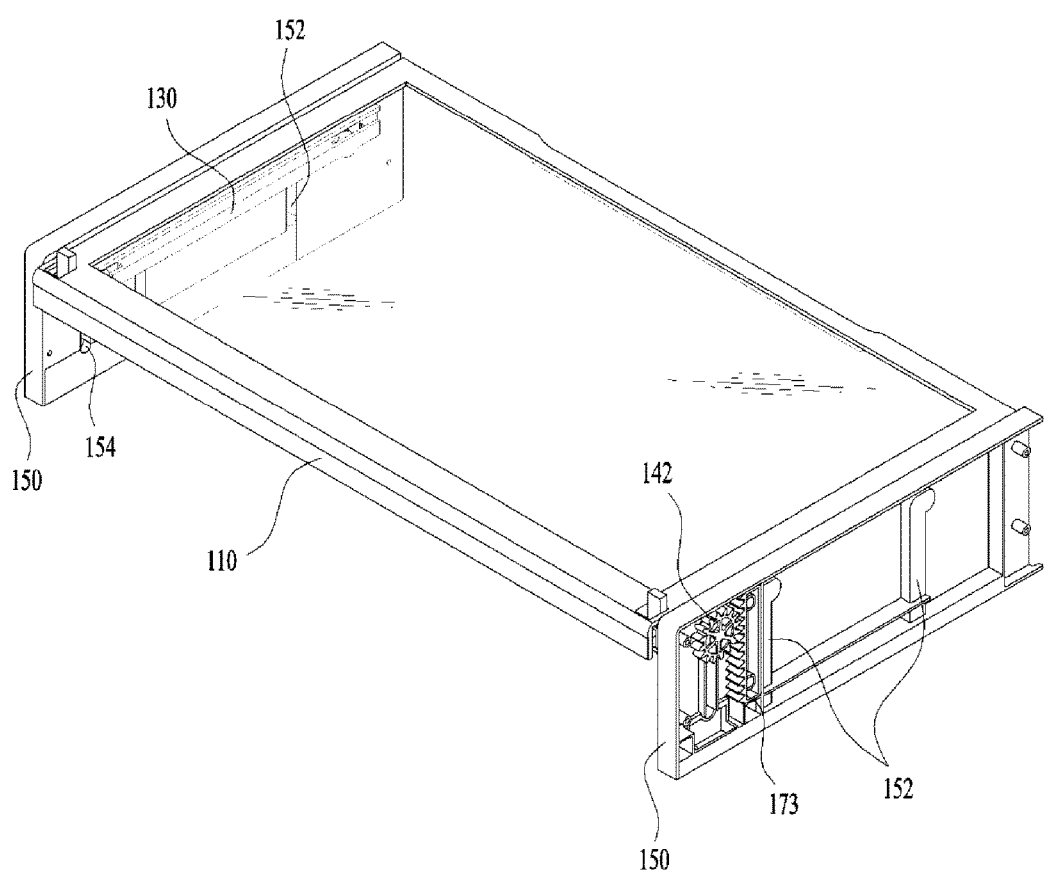
FIG. 7 is a perspective view illustrating an embodiment modified from the shelf assembly of FIG. 2.
Figure 8:
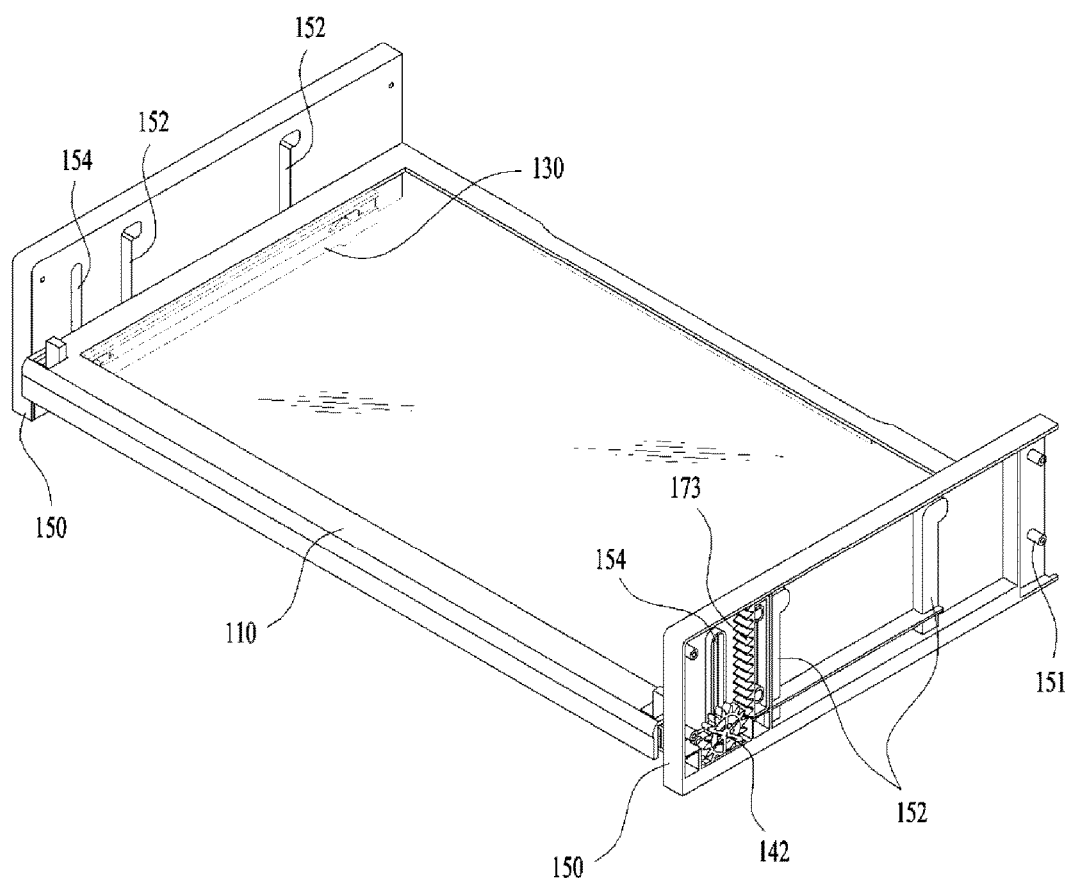
FIG. 8 is a perspective view illustrating a state in which the shelf assembly of FIG. 7 has been moved downwards to a lower position.

FIGS. 7 and 8 illustrate a shelf assembly according to an embodiment modified from the first embodiment. FIG. 7 illustrates a state in which the shelf is positioned at the upper position. FIG. 8 illustrates a state in which the shelf is positioned at the lower position.

The shelf assembly according to the modified embodiment may include the rotating shaft 140 only at the front side, and may not include the rotating shaft, pinions, and shelves at the rear side, as compared to the first embodiment.

The shelf 110 may be prevented from being inclined in left and right directions by the pinions 154 of the front rotating shaft 140 and the corresponding rack gears 173. Additionally, since two pairs of protrusions 142 respectively provided at outer surfaces of a pair of switch members 120 are inserted into and guided by two pairs of guide grooves 152, the shelf 110 may be prevented from being inclined in forward and rearward directions.

Additionally, although the guide ribs 158 at the rear ends of the guide members 150 and the guide protrusions 118 at opposite sides of the rear end of the shelf are eliminated, the shelf 110 may vertically move while maintaining a horizontal state, as described above.

A shelf assembly according to a second embodiment may be described with reference to FIGS. 9 to 11B.

The shelf assembly of the second embodiment, which is designated by reference numeral "200", may differ from the shelf assembly 100 of the first embodiment, mainly in terms of the configuration of the connecting device.

That is, the connecting device in the shelf assembly 200 of the second embodiment may include a first link 280 pivotably mounted to the outer surface of each guide member designated by reference numeral 250 and formed with a slot 283 at one end of the first link 280 to receive the rotating shaft designated by reference numeral 240, so as to pivot in accordance with vertical movement of the rotating shaft 240. The connecting device may further include a second link 290 connected to the other end of the first link 280 while being pivotably mounted to the outer surface of the guide member 250. The second link 290 may be provided with a slot 293 to receive a protrusion 217 formed at a rear portion of the outer surface of the shelf designated by reference numeral "210", and may vertically move the rear half portion of the shelf 210 while pivoting in accordance with pivotal movement of the first link 280.

The first link 280 may be connected, at one end thereof, to the rotating shaft 240 rotatably mounted beneath the shelf 210 while being connected, at the other end thereof, to the second link 290.

The second link 290 may be connected, at one end thereof, to the first link 280 while being connected, at the other end thereof, to the protrusion 217 formed at the rear portion of the outer surface of the shelf 210.

The protrusion 217 may protrude laterally from the rear portion of the outer surface of the shelf 210 and may have a circular column shape. For reinforcement, the protrusion 217 may be formed integrally with a corresponding one of extensions 218 extending downwards from opposite sides of the rear end of the shelf 210.

The first link 280 and the second link 290 may be pivotably mounted to two pivot shafts 258 protruding from the outer surface of the corresponding guide member 250.

Pivot shaft holes 281 and 291 may be formed through intermediate portions of the first and second links 280 and 290. Each pivot shaft 258 may have a boss structure so as to fasten a screw thereto.

Accordingly, the first and second links 280 and 290 may be pivotably mounted by mounting the pivot shaft holes 281 and 291 to the two pivot shafts 258, respectively, and then fastening screws to the pivot shafts 258.

Similarly to the previous embodiment, in the present embodiment, each guide member 250 may include a guide hole 254 formed through the guide member 250 to be vertically elongate, so as to receive the rotating shaft 240, and a guide groove 252 formed at an inner surface of the guide member 250 to extend vertically, so as to receive and guide a protrusion 224 of the corresponding switch member 220.

A pair of pinions 242 may be coupled to opposite ends of the rotating shaft 240. The pinions 242 may be moved vertically while rotating by rack gears 273 of shelf members 270 mounted to the outer surfaces of the guide members 250, respectively.

In the present embodiment, each shelf member 270 may be mounted such that the rack gear 273 thereof is directed in a rearward direction toward the corresponding first and second links 280 and 290.

Each shelf member 270 may be provided with a plurality of bosses 271 formed through the shelf member 270, for screw fastening. A plurality of bosses 257 corresponding to the plurality of bosses 271 may also be provided at the outer surface of the guide member 250, and the shelf member 270 may be fastened to the guide member 250 by a plurality of screws.

Since only one protrusion 224 is provided at the outer surface of each switch member 220, the length of the switch member 220 in forward and rearward directions may be shorter than that of the shelf 210 by half or less, as compared to the switch member 120 of the first embodiment.

Each guide bracket designated by reference numeral "230" may also have a reduced length, similar to the switch member 220.

The protrusion 224 of each switch member 220 may be disposed forwardly of the rotating shaft 240 and the guide groove 252 formed at a front portion of the outer surface of the corresponding guide member 250 is disposed forwardly of the guide hole 254 provided near the guide groove 252.

Bearing grooves 234 provided at each guide bracket 230 may be disposed forwardly of a protrusion movement groove 235 provided at the guide bracket 230. Additionally, grooves 223 and slots 225 provided at each switch member 220 may be disposed rearwards of the protrusion 224.

Each guide member 250 may further include a second guide hole 254 formed to be vertically elongate, so as to receive the corresponding protrusion 217 protruding from the rear portion of the outer surface of the shelf 210. The second guide hole 254 may guide the protrusion 217, to allow the protrusion 217 to move only in a vertical direction.

The second guide hole 254 may be formed in the same manner as the first guide hole 254 formed at the front side of the guide member 250, except for the position thereof.

Accordingly, the rotating shaft 240 may be inserted into and guided by the first guide hole 254, and each protrusion 217 of the shelf 210 may be inserted into and guided by the corresponding second guide hole 254.

Each end of the rotating shaft 240, which emerges from the corresponding first guide hole 254, may also pass through the slot 283 formed at one end of the corresponding first link 280. To the end of the rotating shaft 240, the corresponding pinion 242 may then be coupled at the outside of the first link 280. Thus, assembly is completed.

Although the first link 280 pivots about the corresponding pivot shaft, the slot 283 may allow the rotating shaft 240 to move vertically while being guided by the first guide hole 254.

Each protrusion 217 may simply be inserted into the slot 293 of the corresponding second link 290 after passing through the corresponding second guide hole 254. Similarly to the slot 283, although the second link 290 pivots, the slot 293 may allow the protrusion 217 to move vertically while being guided by the second guide hole 254.

Connection between the corresponding ends of the first and second links 280 and 290 may be achieved by providing a pivot shaft at one of the first and second links 280 and 290, providing a slot at the other one of the first and second links 280 and 290, to receive the pivot shaft, and inserting the pivot shaft into the slot such that the pivot shaft is movable along the slot.

Although a pivot shaft 285 is provided at the other end of the first link 280, to protrude laterally, and a slot is provided at one end of the second link 290, in the illustrated embodiment, the pivot shaft and the slot may be arranged in a reversed manner.

Additionally, since one pinion 242 is disposed at one end of the first link 280 such that the pinion 242 overlaps with the end of the first link 280, and one pivot shaft 285 is provided at the other end of the first link 280, ends of the first link 280 may preferably have a stepped structure so as to prevent interference among constituent elements, and to achieve efficient space utility.

Additionally, the first and second links 280 and 290 may preferably be provided with guide grooves 282 and 292 spaced apart from the pivot shaft holes 281 and 291 while having an arc shape, to guide pivotal movement of the first and second links 280 and 290, together with guide protrusions 259 formed at the outer surface of corresponding guide member 250 and received in the guide grooves 282 and 292, respectively.

The arc-shaped guide grooves 282 and 292 formed through the first and second links 280 and 290 may form predetermined angles with respect to pivot axes of the first and second links 280 and 290, taking into consideration the pivot angle of the first and second links 280 and 290, respectively.

The guide protrusions 259 may be inserted into the guide grooves 282 and 292, respectively, to move with respect to the guide grooves 282 and 292, and may be supported by upper and lower ends of the guide grooves 282 and 292.

Thus, the guide protrusions 259 and the guide grooves 282 and 292 not only function to guide pivotal movements of the two links 280 and 290, but may also function to limit pivot angle ranges of the two links 280 and 290 and to support the shelf 210 at upper and lower positions of the shelf 210.

Operation of the shelf assembly according to the second embodiment may be described.

Figure 9:
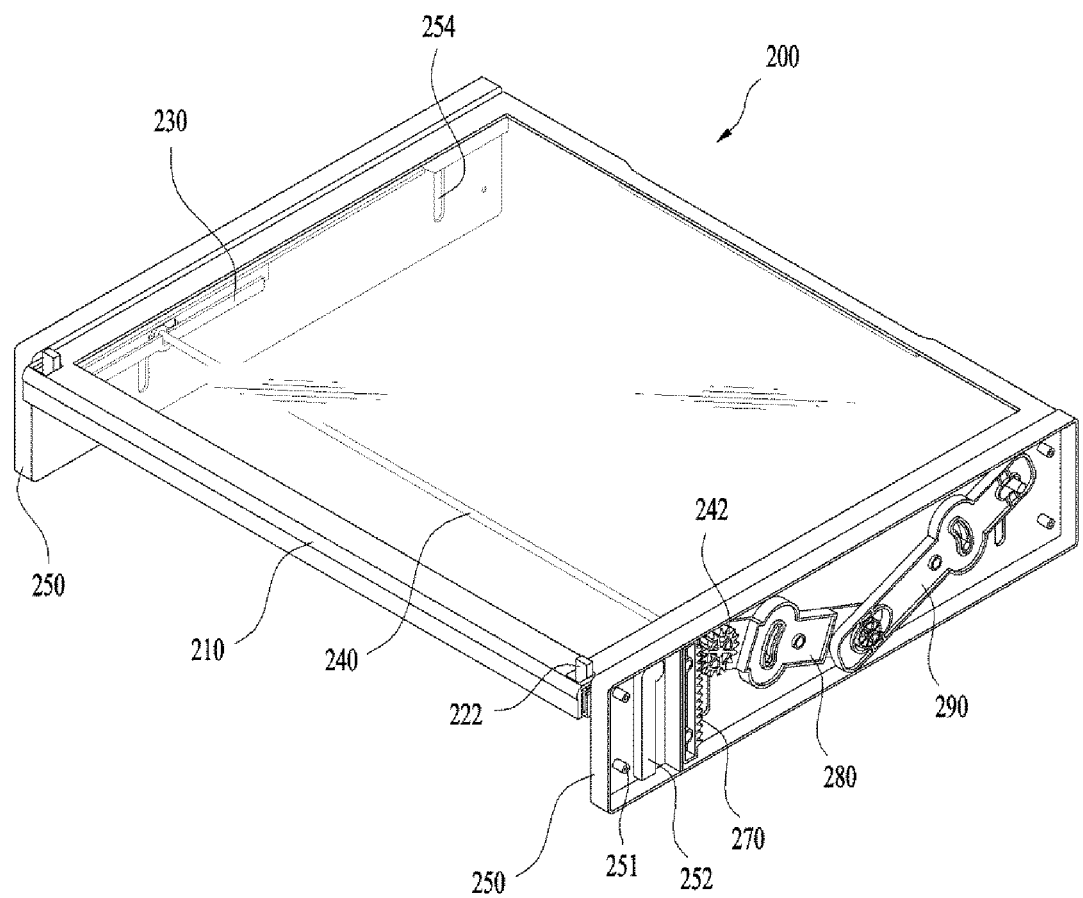
FIG. 9 is a perspective view illustrating a shelf assembly according to a second embodiment.
Figure 10:
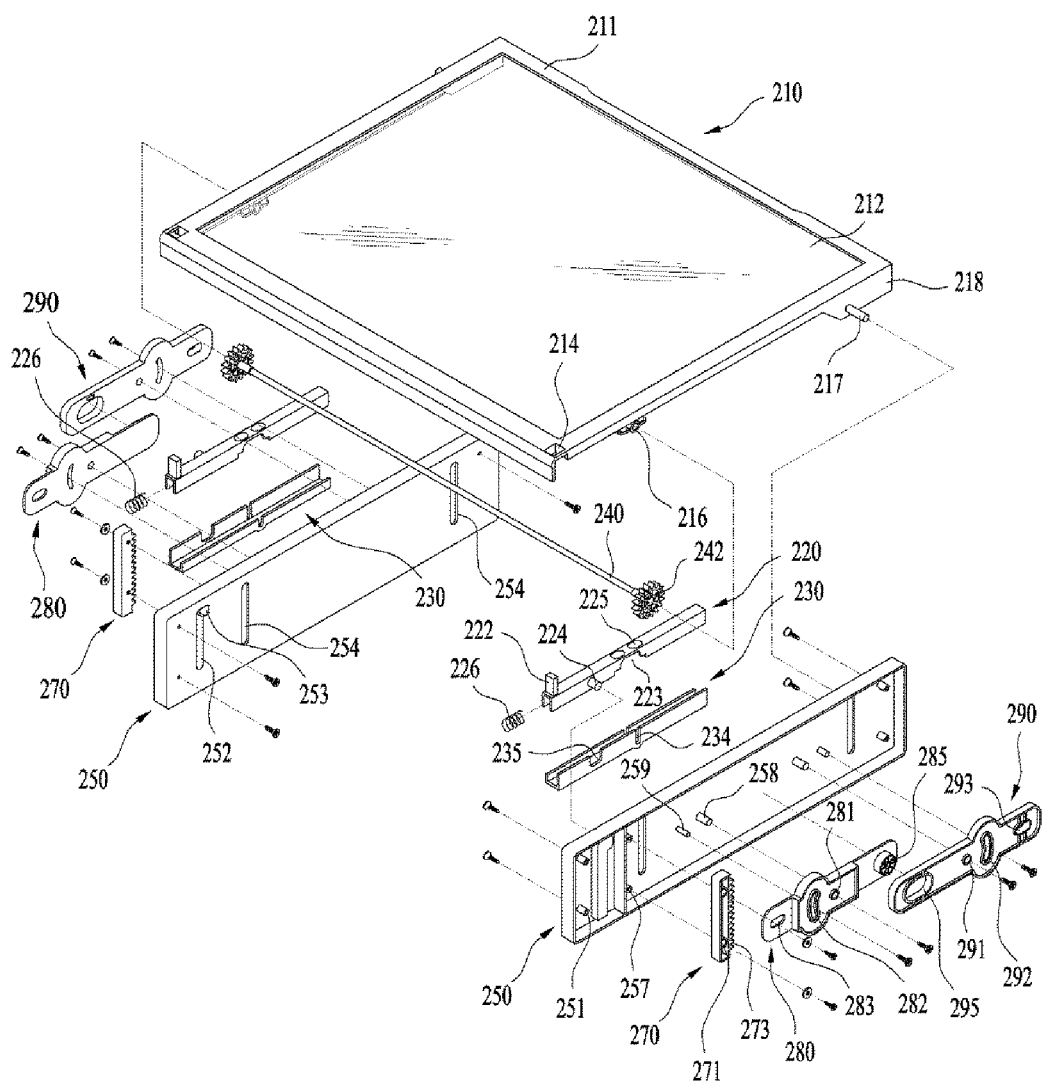
FIG. 10 is an exploded perspective view corresponding to FIG. 9.

When the user pulls both switches 222 under the condition that the shelf 210 is positioned at the upper position, as shown in FIG. 9, the switch members 220 may compress the corresponding elastic members 226, and each protrusion 224 is separated from the horizontal portion 253 of the corresponding guide groove 252, to be allowed to move downwards.

When the user subsequently moves the shelf 210 in a downward direction while supporting opposite sides of the front portion of the shelf 210, the rotating shaft 240 may pivot each first link 280 while moving downwards along the first guide holes 254. At the same time, each second link 290 may pivot, and the protrusions 217 provided at opposite sides of the rear portion of the shelf 210 may move downwards along the second guide grooves 254, respectively.

Figure 11A:
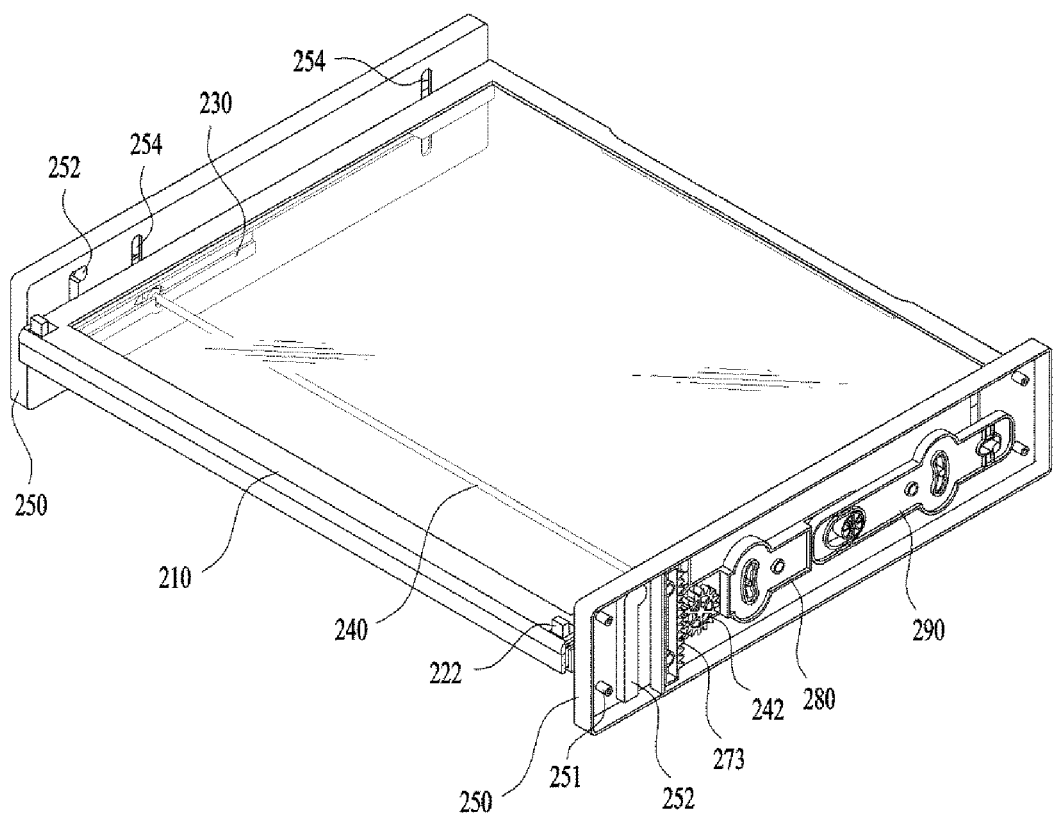
FIGS. 11A and 11B are perspective views illustrating a lowering state of the shelf assembly of FIG. 9.

As the shelf 20 moves downwards while maintaining a horizontal state, the shelf 210 may pass a position where the two links 280 and 290 are horizontally aligned at a middle level, as shown in FIG. 11A.

Figure 11B:
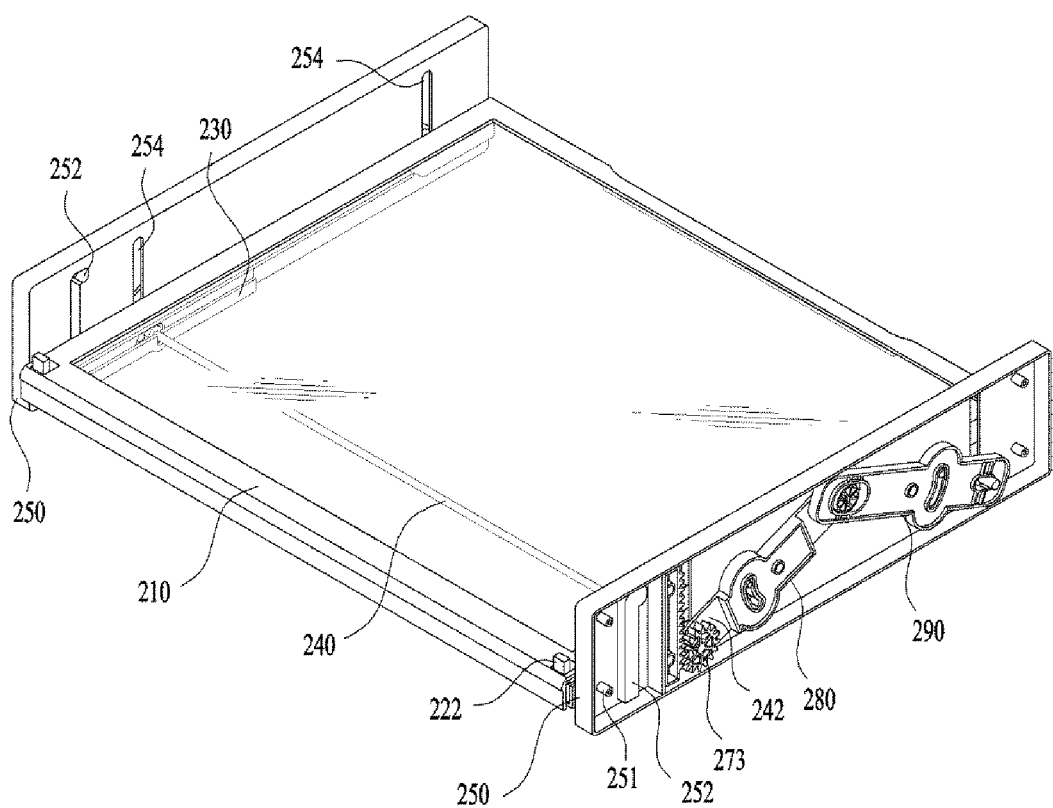

When the shelf 210 is further moved in a downward direction, the rotating shaft 240 may be supported by the lower ends of the first guide holes 254, and the protrusions 217 may be supported by the lower ends of the second guide holes 254. That is, the state of FIG. 11B is obtained.

On the other hand, upward movement of the shelf 210 may be achieved by upwardly pushing the front half portion of the shelf 210 by the user. When the shelf 210 is completely upwardly moved, the protrusion 224 of each switch member 220 may naturally be inserted into and supported by the horizontal portion 253 of the corresponding guide groove 252 by the corresponding elastic member 226.

A shelf assembly according to a third embodiment may be described with reference to FIGS. 12 and 13.

The shelf assembly of the third embodiment, which is designated by reference numeral 300, may differ from the shelf assembly 200 of the second embodiment, mainly in terms of configuration of the connecting device. In particular, structures and coupling relation of two links.

That is, the connecting device in the shelf assembly 300 of the third embodiment may include a first link 380 pivotably mounted to the outer surface of each guide member designated by reference numeral 350 and arranged to allow one end thereof to be upwardly pushed by the rotating shaft designated by reference numeral 340, while being formed with a gear 385 around a pivot shaft 381 provided at the other end of the first link 380, to pivot the first link 380 in accordance with upward movement of the rotating shaft 340. The connecting device may further include a second link 390 formed with a gear 395 around a pivot shaft 391 provided at one end of the second link 390 such that the gear 395 engages with the gear 385 of the first link 380, and arranged to upwardly push a protrusion 317 formed at a rear portion of the outer surface of the shelf designated by reference numeral 310 by the other end of the second link 390.

One end of the first link 380 may not have a structure having a hole, through which the rotating shaft 340 extends, but may be formed to be laid on the rotating shaft 340.

Similarly, the other end of the second link 390 may not have a structure for receiving the protrusion 317, but may be disposed beneath the protrusion 317, to upwardly push the protrusion 317.

A pivot shaft hole 381 may be formed at the center of the gear 385 provided at the other end of the first link 380. The pivot shaft hole 381 may be mounted to a pivot shaft protruding from the outer surface of the guide member 350.

The pivot shaft may take the form of a boss, to which a screw may be fastened. The pivot shaft hole 381 may take the form of a through hole, through which a screw passes.

Similarly to the gear 385, a pivot shaft hole 391 may be formed at the center of the gear 395 provided at one end of the second link 390. The pivot shaft hole 391 may be mounted to a pivot shaft protruding from the outer surface of the guide member 350.

Similarly to the second embodiment, in the third embodiment, each guide member 350 may include a guide groove 352 formed at a front portion of an inner surface of the guide member 350 to extend vertically, so as to receive and guide a protrusion of the corresponding switch member, a front guide hole (i.e., a first guide hole 354) for receiving and guiding the rotating shaft 340, which is mounted beneath the shelf 310, and a rear guide hole, namely, a second guide hole 354, formed to be vertically elongate so as to receive the protrusion 317 formed at the rear portion of the outer surface of the shelf 310. The second guide hole 354 may guide the protrusion 317 to move only in a vertical direction.

Additionally, the first and second links 280 and 290 may preferably be provided with guide grooves 382 and 392 spaced apart from the pivot shaft holes 381 and 391 while having an arc shape, to guide pivotal movement of the first and second links 380 and 390, together with guide protrusions 359 formed at the outer surface of corresponding guide member 350.

The guide protrusions 359 may be received in the guide grooves 382 and 392, respectively, and may guide pivotal movements of the two links 380 and 390 and limit pivot angle ranges of the two links 380 and 390.

Operation of the shelf assembly according to the third embodiment may be described.

Figure 12:
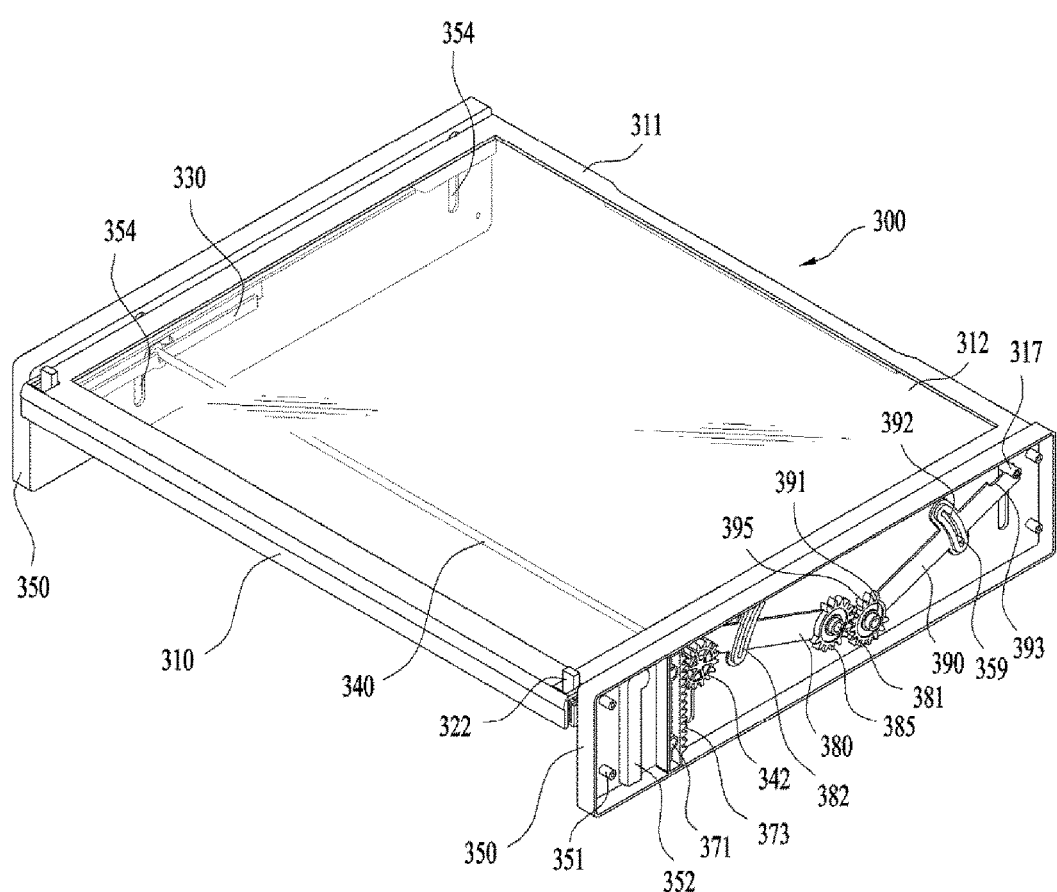
FIG. 12 is a perspective view illustrating a shelf assembly according to a third embodiment.
Figure 13:
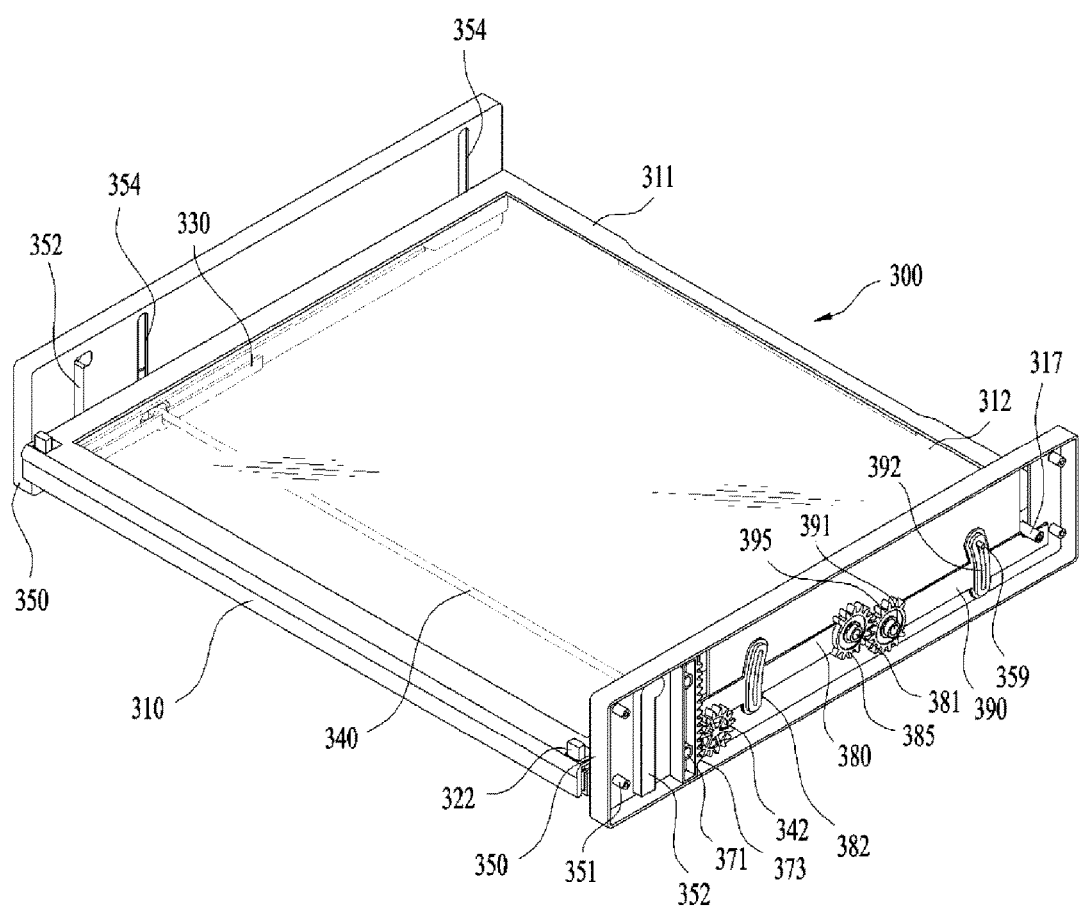
FIG. 13 is an exploded perspective view corresponding to FIG. 12.

When the user pulls both switches 322 under the condition that the shelf 310 is positioned at the upper position, as shown in FIG. 12, the switch members compress the corresponding elastic members, and a protrusion formed at each switch member may be separated from a horizontal portion of the corresponding guide groove 352 to be allowed to move downwards.

When the user subsequently moves the shelf 310 in a downward direction while supporting opposite sides of the front portion of the shelf 310, the rotating shaft 340 may pivot each first link 380 while moving downwards along the first guide holes 354. At the same time, the protrusions 317 provided at opposite sides of the rear portion of the shelf 310 may pivot respective second links 390 while moving downwards. As a result, the two links 380 and 390 coupled by the gears 385 and 395 may simultaneously pivot.

When the shelf 310 is completely moved in a downward direction to a lower position thereof, the rotating shaft 340 may be supported by the lower ends of the first guide holes 354, and the protrusions 317 may be supported by the lower ends of the second guide holes 354. That is, the state of FIG. 13 is obtained.

On the other hand, upward movement of the shelf 310 may be achieved by upwardly pushing the front half portion of the shelf 310 by the user. When the shelf 310 is completely upwardly moved, the protrusion of each switch member may naturally be inserted into and supported by the horizontal portion of the corresponding guide groove 352.

In this state, the rotating shaft 340 may support one end of each first link 380, and the first link 380 may not pivot. Additionally, the second link 390, coupled to the first link 380, may be in a fixed state without pivoting. Accordingly, each of the protrusions 317 at opposite sides of the rear end of the shelf 310 may be supported by the other end of the corresponding second link 390.

Thus, opposite sides of the front half portion of the shelf 310 and opposite sides of the rear half portion of the shelf 310 may be maintained at the upper position, and the shelf 310 may be maintained in a horizontal state.

A shelf assembly according to a fourth embodiment may be described with reference to FIGS. 14 to 20.

Figure 14:
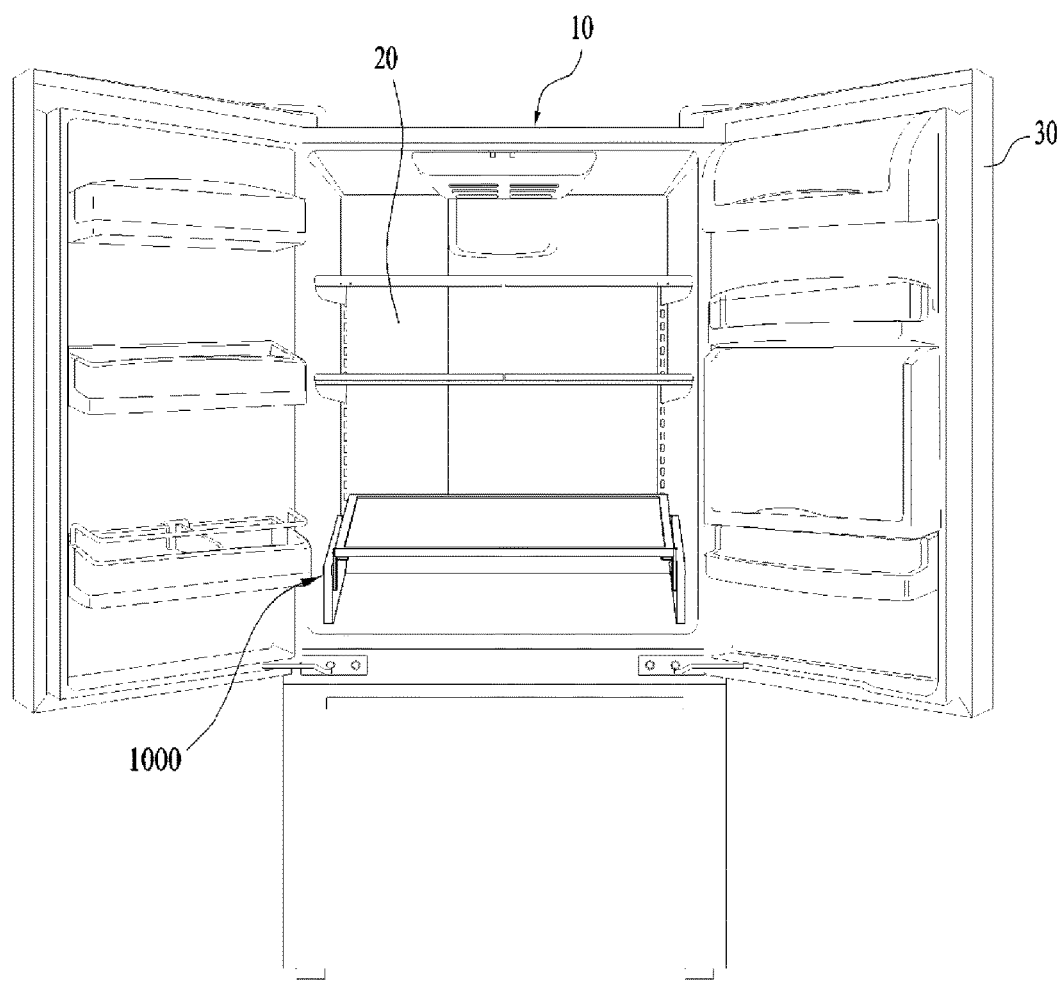
FIG. 14 is a front perspective view illustrating a refrigerator provided with a shelf assembly according to a fourth embodiment.

As shown in FIG. 14, the refrigerator may include a cabinet 10 defined with a storage chamber 20 therein, and a shelf assembly 1000 provided at an interior of the storage chamber 20.

A refrigerator according to an embodiment may be a bottom freezer type refrigerator in which a refrigerating compartment is provided at a top side of the cabinet 10, and a freezing compartment is provided at a bottom side of the cabinet 10. However, the shelf assembly 1000 may also be applied to refrigerators of any types, so long as the shelf assembly 1000 is mountable in a storage chamber such as a refrigerating compartment or a freezing compartment.

The refrigerating compartment provided at the top side of the cabinet 10 may be opened or closed by a pair of pivotally-mounted refrigerating compartment doors 30.

The freezing compartment provided at the bottom side of the cabinet 10 may be opened or closed by a freezing compartment door, which is a drawer type door. The freezing compartment may be opened or closed by a pair of pivotally-mounted freezing compartment doors.

The shelf assembly 1000 may be mounted in the storage chamber 20, and may include a vertically movable shelf. Only one shelf assembly 1000 may be installed, although two or more shelf assemblies 1000 may be installed at different levels.

Figure 15A:
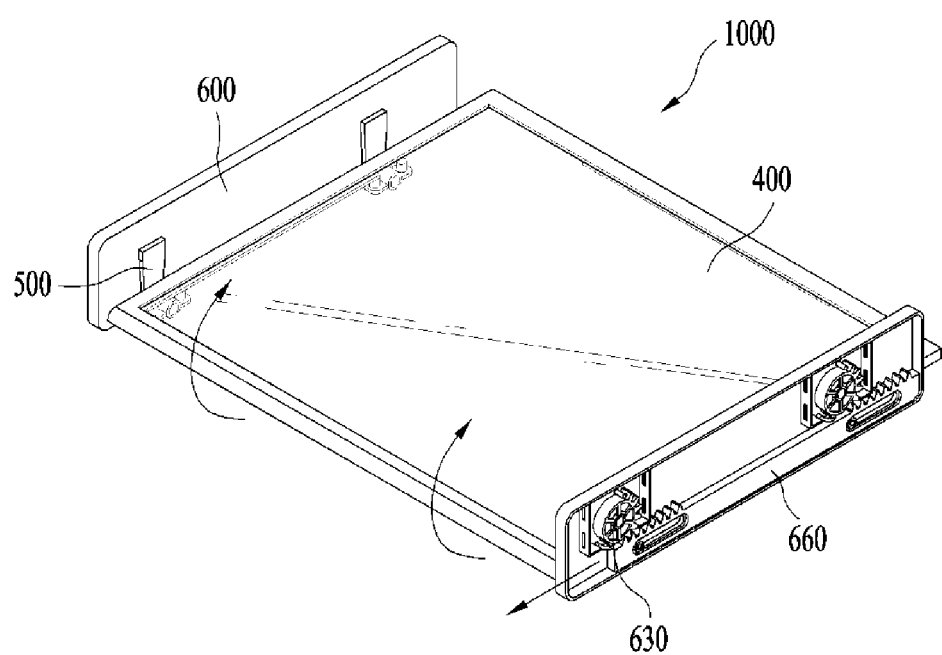
FIGS. 15A and 15B are perspective views illustrating operation of the shelf assembly provided at the refrigerator according to the fourth embodiment.
Figure 15B:
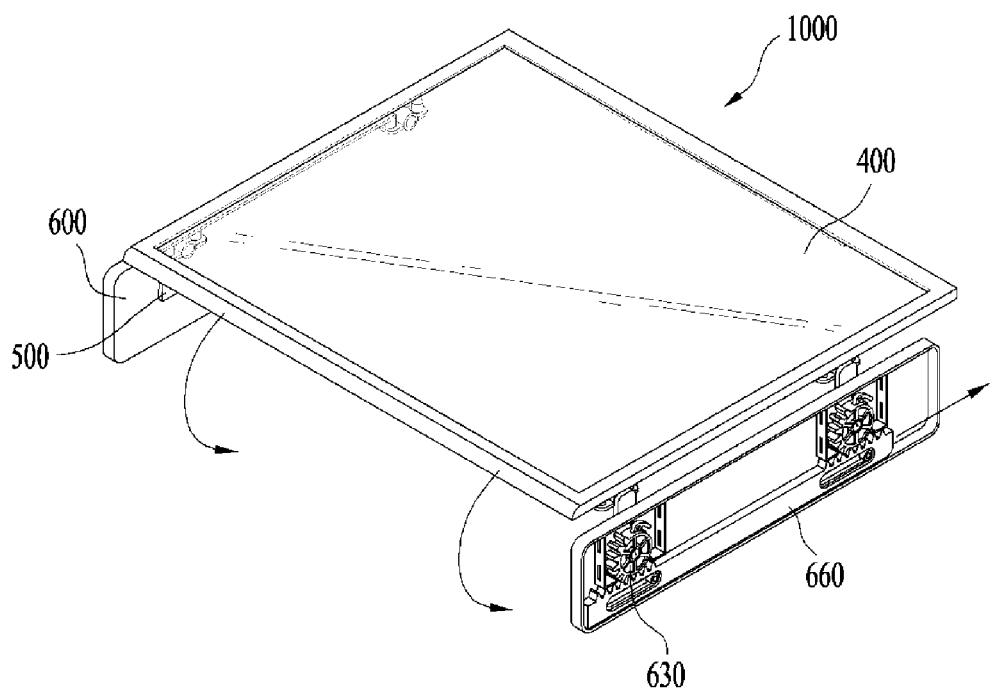

FIGS. 15A and 15B illustrate operation of the shelf assembly included in the refrigerator according to the illustrated embodiment.

Referring to FIGS. 15A and 15B, it can be seen that, in the shelf assembly included in the refrigerator, the user may move the shelf in an upward or downward direction while grasping the front portion of the shelf, and may adjust the level of the shelf, using a locking device, which may be described below.

Constituent elements and operation of the shelf assembly may be described.

Figure 16:
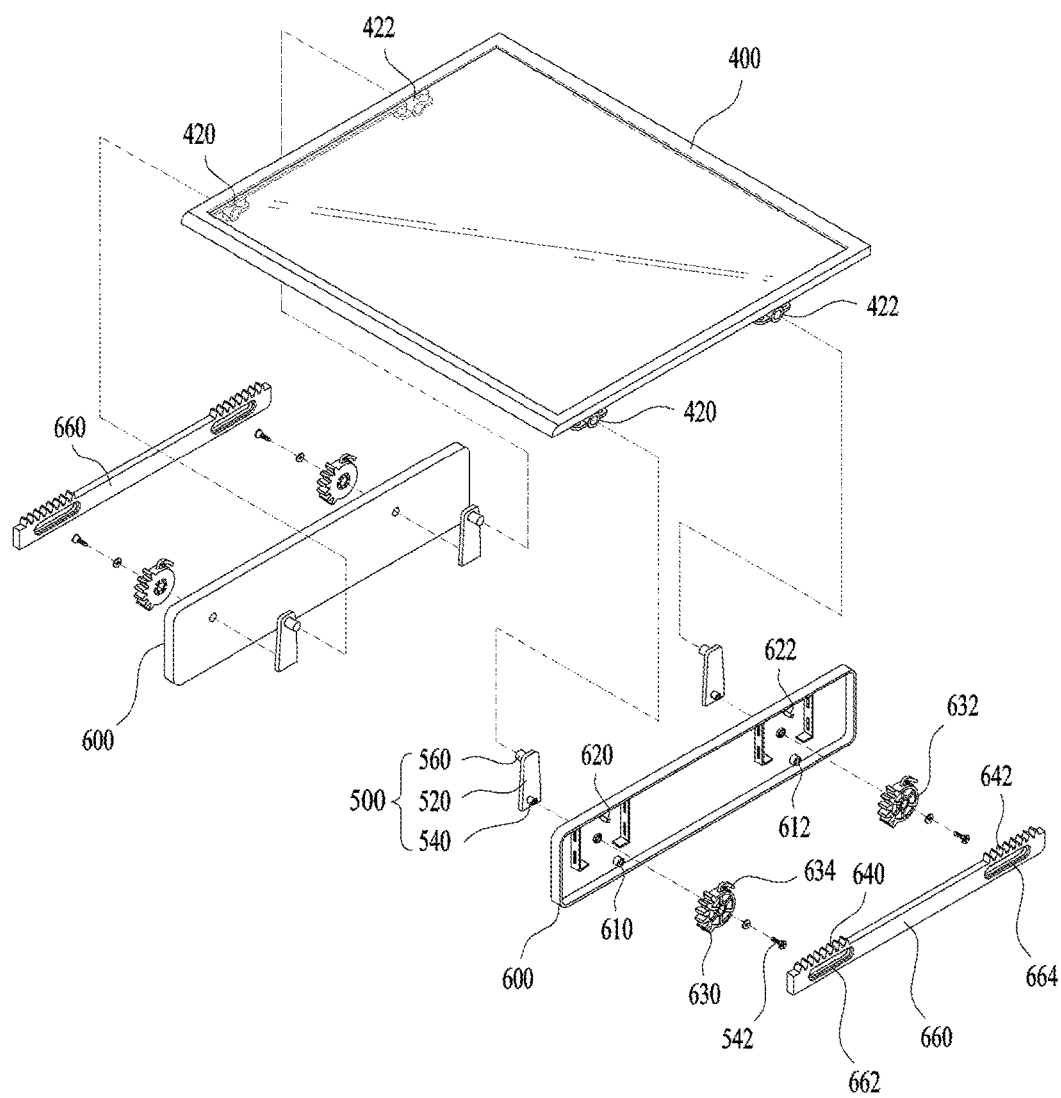
FIG. 16 is an exploded perspective view illustrating the shelf assembly provided at the refrigerator according to the fourth embodiment.
Figure 17:
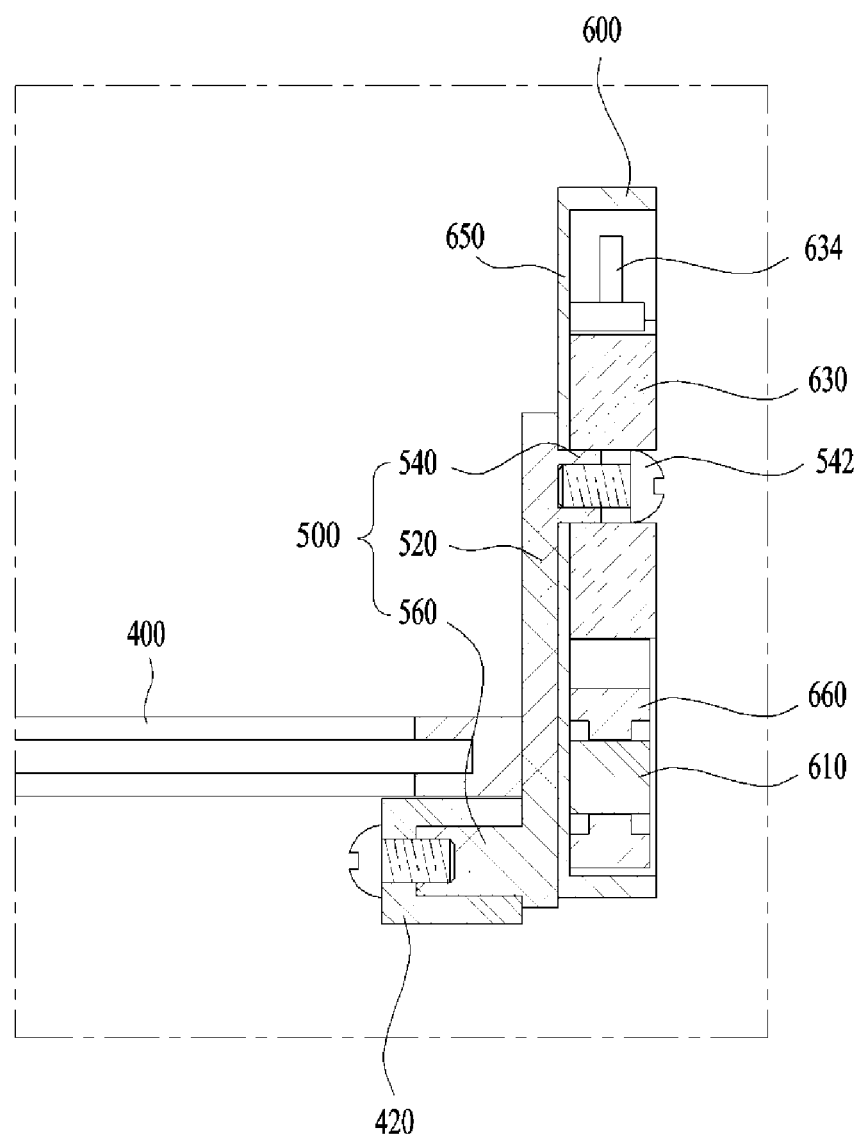
FIG. 17 is a sectional view illustrating the shelf assembly provided at the refrigerator according to the fourth embodiment.

The shelf assembly 1000 may be described with reference to FIGS. 16 and 17.

The shelf assembly 1000 may include a pair of guides 600 mounted to opposite inner side walls of the storage chamber 20, rotating members 500 rotatably connected to side surfaces of the guides 600, and a shelf 400 rotatably connected to the rotating members 500, to be vertically movable.

Each rotating member 500 may include a first rotating shaft 540 extending through the side surface of the corresponding guide 600, to connect outside and inside of the guide 600, a rotating bar 520 disposed outside the guide 600 and connected to the first rotating shaft 540, and a second rotating shaft 560 connected, at one side thereof, to the rotating bar 520 while being connected, at the other side thereof, to the shelf 400.

The first rotating shaft 540 may be fixed to a corresponding one of rotating gears 630 and 632 provided at the inside of the guide 600, using a first fixing member 542, and may rotate at a same speed as the corresponding rotating gear 630 or 632. Description of the rotating gears 630 and 632 may be provided below.

The second rotating shaft 560 may be rotatably connected to the shelf 400.

The shelf 400 may include a glass 440, on which stored articles are placed, to be supported, and a frame 460 for supporting the glass 440.

The shelf 400 may also include couplers 420 and 422 mounted to a lower surface of the frame 460. The second rotating shaft 560 of each rotating member 500 may be rotatably connected to a corresponding one of the couplers 420 and 422. Accordingly, when the shelf 400 moves vertically, relative rotation may occur between the corresponding second rotating shaft 560 and coupler 420 or 422.

Connection portions of the second rotating shaft 560 and rotating bar 520 may be rotatable with respect to each other, and relative rotation may occur between the second rotating shaft 560 and the rotating bar 520.

Since the rotating bar 520 rotates under the condition that the rotating bar 520 is disposed between the shelf 400 and the outer surface of the corresponding guide 600, the rotating bar 520 may preferably be constituted by a thin and elongate plate. In each rotating member 500, the first rotating shaft 540 and the second rotating shaft 560 may be provided at different surfaces of the rotating bar 520.

When the shelf 400 moves vertically, the rotating bar 520 may be rotated about the first rotating shaft 540. As a result, the shelf 400 connected to the second rotating shaft 560 may be moved vertically while tracing a circular arc. Thus, level adjustment of the shelf 400 may be achieved.

A pair of guides 600 installed at opposite inner side walls of the storage chamber 20 may be described. The guides 600 installed at the opposite inner side walls may have the same shape and are mirror symmetrical. Accordingly, the following description may be provided only in conjunction with one guide 600.

The guide 600 may include the rotating gears 630 and 632, which are installed at the inside of the guide 600, and connected to respective rotating shafts 540, rack gears 640 and 642 respectively engaged with the rotating gears 630 and 632, and a body 650 for receiving the rotating rears 630 and 632, and the rack gears 640 and 642.

The body 650 may take a plate-shaped rectangular parallelepiped structure. The body 650 may preferably be opened at one side surface. Accordingly, constituent elements such as the rotating gears 630 and 632, and the rack gears 640 and 642 may be easily assembled through the opened side surface.

The body 650 may be installed at the inner wall of the storage chamber 20 under the condition that the rotating gears 630 and 632, and the rack gear 640 and 642 are received in the body 650, and it may be impossible to view driving of the rotating gears 630 and 632, and the rack gear 640 and 642 at the outside.

The rotating gears 630 and 632 may be fixed to respective first rotating shafts 540, to rotate together with the first rotating shafts 540.

Additionally, each of the rotating gears 630 and 632 may be provided with teeth at an outer circular circumferential surface thereof.

Each of the rack gears 640 and 642 may be a bar type gear having teeth corresponding to a corresponding one of the rotating gears 630 and 632. Each of the rack gears 640 and 642 may engage with the corresponding rotating gear 630 or 632, and may be moved in a forward or rearward direction when the corresponding rotating gear 630 or 632 rotates.

Respective rotating members 500, respective rotating gears 630 and 632, and respective rack gears 640 and 642 may be provided at front and rear sides of each guide 600. Respective couplers 420 and 422 provided at the lower surface of the shelf 400 may be disposed at front and rear sides of the shelf 400.

A linkage 660 may be provided to connect the front rack gear 640 and the rear rack gear 642 so as to simultaneously rotate the front rack gear 640 and the rear rack gear 642. That is, both the front rack gear 640 and the rear rack gear 642 may be disposed at one surface of the linkage 660.

The front rack gear 640 and the rear rack gear 642 may be connected by the linkage 660, and may move in a simultaneous manner. Accordingly, when the front rotating gear 630 rotates, the rear rotating gear 632 may rotate in the same direction and same angular velocity as the front rotating gear 630.

Thus, when the linkage 660 moves forwards or rearwards, the front and rear rack gears 640 and 642 may be moved at the same speed, and the front and rear rotating gears 630 and 632 engaged with the front and rear rack gears 640 and 642 may be moved at the same angular velocity, and the rotating members 500 connected to the front and rear rotating gears 630 and 632 may be moved at the same angular velocity. As a result, the shelf 400 may be vertically moved while maintaining in a horizontal state.

Advantages of the linkage 660 may be described.

When it is desired to upwardly move the shelf 400, on which stored articles are placed, the user upwardly lifts the shelf 400 while grasping the front portion of the shelf 400. If there is no linkage 660, there may be a problem in that, which the user upwardly lifts the shelf 400, the rear rotating gear 632 rotates in an opposite direction to a rotation direction of the front rotating gear 630, and the shelf 400 is inclined rearwards.

This is because, when the gravity at the rear portion of the shelf 400 is greater than the force to upwardly lift the shelf 400 by the user, the center of gravity at the rear portion of the shelf 400 is shifted forwardly of the center of the rear rotating gear 632, and torque in a direction reverse to the rotation direction of the front rotating gear 630 is applied to the rear rotating gear 632.

Figure 18:
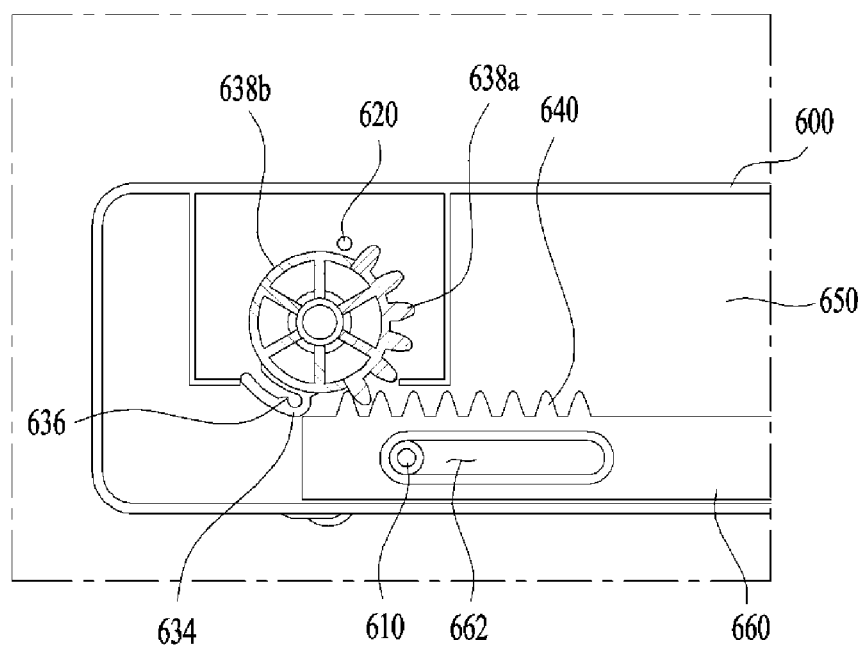
FIG. 18 is a side view illustrating an interior of a guide in a state in which the shelf of the shelf assembly provided at the refrigerator according to the fourth embodiment is positioned at a lower position.
Figure 19:
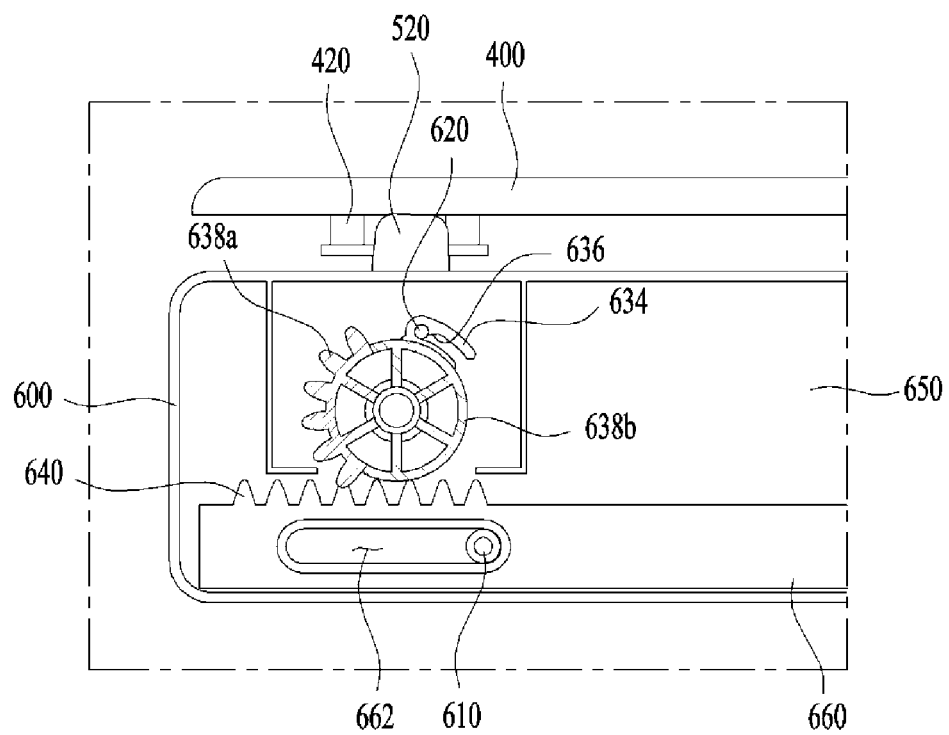
FIG. 19 is a side view illustrating the interior of the guide in a state in which the shelf of the shelf assembly provided at the refrigerator according to the fourth embodiment is positioned at an upper position.

Referring to FIGS. 18 and 19, the shelf assembly 400 may include protrusions 610 and 612 provided at the body 650, and guide grooves 662 and 664 respectively guided by the protrusions 610 and 612.

Each of the guide grooves 662 and 664 may take the form of a groove provided at one surface of the linkage 600 while being elongate in a movement direction of the linkage 660. Each of the guide grooves 662 and 664 may not take the form of a through hole. When the linkage 660 moves forwards or rearwards, the protrusions 610 and 612 may guide movement of the linkage 660 under the condition that the protrusions 610 and 612 are inserted into the guide grooves 662 and 664, respectively. Accordingly, the linkage 660 may be prevented from being separated during movement thereof.

Each of the guide grooves 662 and 664 may have a predetermined length to limit movement of the linkage 660. The lengths of the guide grooves 662 and 664 may be determined such that the maximum rotation angle of the rotating gears 630 and 632 exceeds 180°. The lengths of the guide grooves 662 and 664 may preferably be determined such that the maximum rotation angle of the rotating gears 630 and 632 is greater than 180° and is less than 190°.

In other words, the linkage 660 and the rack gears 662 and 664 can move a distance corresponding to the length of each of the guide grooves 662 and 664, and the distance may be determined such that the rotation angles of the rotating gears 630 and 632 rotating while engaging with the rack gears 640 and 642 is greater than 180° and is less than 190°.

Additionally, the shelf 400 may preferably be positioned at a lowest point when the linkage 660 is moved to a rearmost point.

Additionally, when the linkage 660 is forwardly moved to a foremost point, the shelf 400 may be positioned after slightly passing a highest point. The rotation angles of the rotating gears 630 and 632 may be greater than 180° and less than 190°.

The reason why the maximum rotation angles of the rotating gears 630 and 632 exceed 180° is that, although there is an advantage when the maximum angles are 180° such that it is possible to position the shelf 400 at a highest level, the shelf 400 may be forwardly moved with a very slight force because the center of gravity of the shelf 400 and stored articles thereon is vertically aligned with centers of the rotating gears 630 and 632, and the shelf 400 may be abruptly moved to a lowest point due to the gravity of the shelf 400 and stored articles thereon, and there may be a danger such as damage of the assembly or stored articles during the movement.

The maximum rotation angles of the rotating gears 630 and 632 may be determined to be greater than 180° and less than 190°, and the center of gravity of the shelf 400 and stored articles thereon may be positioned rearwards of the centers of the rotating gears 630 and 632. Accordingly, it may be possible to further prevent the shelf 400 from moving forwards as gravity of the shelf 400 and stored articles thereon increases.

In other words, the above condition is given to position the center of gravity of the shelf 400 at a position over a selected one of a first range, namely, a rotating radius range of each rotating bar 520 with respect to a vertical line passing through the center of a corresponding one of the rotating gears 630 and 632, and a second range, namely, a non-rotation radius range of the rotating bar 520. Thus, it may be possible to obtain effects capable of maintaining the shelf 400 at an upper position by virtue of the gravity of the shelf 400 and stored articles thereon.

Additionally, engagement portions, hooks, and protrusions may be described with reference to FIGS. 18 and 19.

In accordance with the illustrated embodiment, the shelf assembly may further include engagement portions 620 and 622 protruding from the body 650, and hooks 634 protruding from outer circumferential surfaces of the rotating gears 630 and 632, to form curved groove, in which the engagement portions 620 and 622 are engaged.

Each hook 634 may have a U-shaped structure, and may be fixed, at one side thereof, to the outer circumferential surface of a corresponding one of the rotating gears 630 and 632, and a corresponding one of the engagement portions 620 and 622 is engaged in the interior of the U-shaped structure. Embodiments are not limited to the case in which the hooks 634 have the U-shaped structure. The hooks 634 may have any shape, so long as the engagement portions 620 and 622 can be engaged in the hooks 634.

Additionally, the shelf assembly may further include protrusions 636 provided at the curved grooves of the hooks 634, to lock the engagement portions 620 and 622, respectively.

Accordingly, the engagement portions 620 and 622 may be locked in the grooves of the hooks 634 by the protrusions 636, and the rotating gears 630 and 632 may be prevented from rotating reversely.

The position where the engagement portions 620 and 622 are engaged in the hooks 634 may preferably correspond to the position where the maximum angles of the rotating gears 630 and 632 is greater 180° and is less than 190°.

Accordingly, the engagement portions 620 and 630 may prevent the rotating gears 630 and 632 from rotating through an angle greater than 190° because the engagement portions 620 and 630 are engaged in the hooks 634, and the shelf 400 may be prevented from again rotating toward the lowest point after passing the highest point.

As shown in FIG. 19, the engagement portions 620 and 622 may prevent the rotating gears 630 and 632 from rotating reversely because the engagement portions 620 and 622 are locked by the protrusions 636, respectively, and the shelf 400 may be locked at the upper position.

The hooks 634 and the protrusions 636 may be made of an elastic material having elasticity.

Accordingly, when the user pulls the shelf 400 with slight force in order to move the shelf 400 in a downward direction, the hooks 634 and the protrusions 636, which are engaged with the engagement portions 620 and 622, may be deformed to form enlarged gaps, and the locked state may be released.

The shape of each rotating gear may be described with reference to FIGS. 18 and 19.

The outer circumferential surface of each of the rotating gears 630 and 632 may include a first circumferential surface 638a, which is a surface portion engaging with a corresponding one of the rack gears 640 and 642, and a second circumferential surface 638b, which is the remaining surface portion, except for the first circumferential surface 638a.

Each of the rotating gears 630 and 632 may be provided with teeth only at the first circumferential surface 638a thereof, and no tooth may be provided at the second circumferential surface 638b.

Accordingly, manufacturing costs of the rotating gears 630 and 632 may be reduced. Additionally, the small internal space of the guide 600 may be efficiently used.

The small internal space of the guide 600 may be more efficiently used in that the hooks 634 are provided at the second circumferential surfaces 638b of the rotating gears 630 and 632. As a result, the size of the guide 600 may be reduced.

Figure 20:
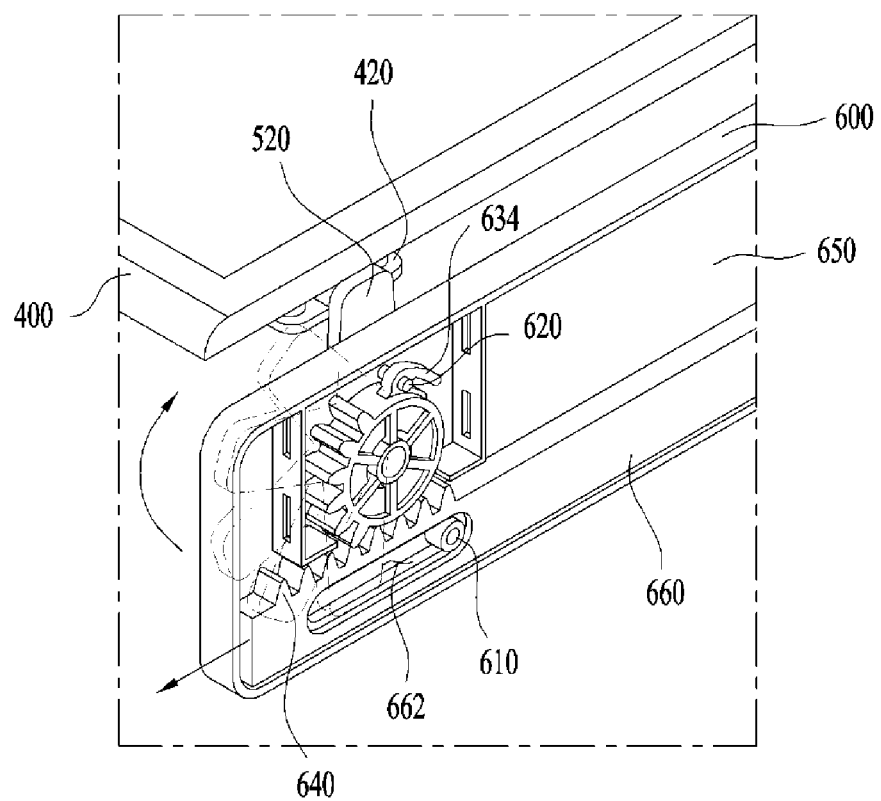
FIG. 20 is a perspective view illustrating operation carried out in the interior of the guide in the shelf of the shelf assembly provided at the refrigerator according to the fourth embodiment.

Operation of the shelf assembly according to the illustrated embodiment may be described with reference to FIG. 20.

When the user upwardly lifts the shelf 400 by applying force to the shelf 400, the shelf 400 may be moved upwardly while rotating along a circular arc trace. At this time, the front rotating gear 630 may rotate, thereby causing the front rack gear 649 engaged therewith to move forwards. As a result, the linkage 660 and the rear rack gear 642 integrated with the front rack gear 642 may be moved forward.

The rear rotating gear 632 engaged with the rear rack gear 642 may be rotated in the same direction as the front rotating gear 630, and the rear portion of the shelf 400 may be lifted upward by the rotating member 500 coupled to the rear coupler 422.

The shelf 400 may move upward while being maintained in a horizontal state. The shelf 400 may be locked as the engagement portions 620 and 622 are engaged in the hooks

634 provided at the rotating gears 630 and 632, and may subsequently be locked by the protrusions 636 of the hooks 634.

Downward movement of the shelf 400 may be achieved in accordance with a mechanism reverse to the above-described mechanism.

In accordance with the shelf assembly of the fourth embodiment, although the shelf 400 moves in forward and rearward directions by a distance between the two rotating shafts of the rotating member 500, the movement distance may not be so great because the movement distance corresponds to half the vertical movement distance.

On the other hand, the structure of the shelf assembly may be considerably simple, as compared to those of the previous embodiments. Additionally, the shelf may be easily moved to the upper position or the lower position, and may be easily locked to the moved position.

Additionally, even when the user only lifts a front portion of the lower surface of the shelf, the shelf may be upwardly moved because the shelf is rotated while being maintained in a horizontal state by the linkage.

As apparent from the above description, in accordance with the refrigerator according to the present disclosure, there are effects capable of easily moving the shelf in a vertical direction even under the condition that articles are placed on the shelf.

Additionally, there are effects capable of maintaining the shelf in a horizontal state in left and right directions during vertical movement thereof.

Additionally, even when the user vertically moves only the front portion of the shelf, the entirety of the shelf is vertical movable while being maintained in a horizontal state.

Embodiments may be directed to a refrigerator that substantially obviates one or more problems due to limitations and disadvantages of the related art.

An object of the present disclosure is to provide a refrigerator capable of easily adjusting level of a shelf even in a state in which stored articles are provided on the shelf.

Another object of the present disclosure is to provide a refrigerator capable of keeping a shelf in a horizontal state in forward and rearward directions and in left and right directions even during movement of the shelf, thereby preventing stored articles from falling from the shelf.

To achieve these objects and other advantages and in accordance with the purpose of the disclosure, as embodied and broadly described herein, a refrigerator includes a cabinet defined with a storage chamber therein, a pair of guide members respectively mounted to opposite sides of the storage chamber, each of the guide members including a guide hole formed through a side wall of the guide member, to be vertically elongate, and a guide groove formed at an inner surface of the guide member, to be vertically elongate, a shelf mounted to the guide members, to be vertically movable, a pair of switch members respectively mounted to opposite sides of the shelf, to be movable in forward and rearward directions, each of the switch members including a body, and a protrusion protruding from an outer surface of the body, to be guided along the guide groove of a corresponding one of the guide members, a rotating shaft rotatably mounted beneath the shelf, to be guided along the guide holes of the guide members, pinions respectively provided at opposite ends of the rotating shaft, to rotate together with the rotating shaft, rack gears vertically mounted to outer surfaces of the guide members, to be coupled to the pinions, respectively, and a connecting device for transmitting a force to vertically move a front half portion of the shelf to a rear half portion of the shelf such that the shelf is vertically movable while being maintained in a horizontal state.

The guide groove may include a vertical portion formed at an inner surface of the guide member to a predetermined depth while being vertically elongate, and a horizontal portion formed at an upper end of the vertical portion, to extend horizontally.

The body of each of the switch members may be elongate in forward and rearward directions. The connecting device may include a second protrusion laterally protruding from a rear portion of an outer surface of the body in each of the switch members, and a second guide groove formed at a rear portion of the inner surface of the guide member corresponding to the switch member.

The refrigerator may further include guide brackets respectively coupled to lower surfaces of opposite ends of the shelf, to support the switch members such that the switch members are slidable in forward and rearward direction.

The refrigerator may further include elastic members each mounted between a front surface of a corresponding one of the switch members and an inner surface of the shelf, to provide a restoring force to push the corresponding switch member in a rearward direction.

The shelf may include two pairs of rotating shaft mounting portions provided at lower surfaces of opposite ends of the shelf, to receive the rotating shaft so as to support the rotating shaft. The rotating shaft may include two rotating shafts to be inserted into the two pairs of the rotating shaft mounting portions so as to be supported by the two pairs of the rotating shaft mounting portions, respectively. The pinions may include two pairs of pinions respectively coupled to opposite ends of the two rotating shafts. The rack gears may include two pairs of racks coupled to the two pairs of pinions, respectively.

Each of the guide members may further include a guide rib provided at the guide member, to be vertically elongate. The shelf may include guide protrusions formed at opposite sides of a rear end of the shelf, to enclose the guide ribs of the guide members, respectively, the guide protrusions being slidable along the guide ribs, respectively.

The connecting device may include a first link pivotably mounted to the outer surface of each of the guide members and formed with a slot at one end of the first link, to receive the rotating shaft so as to pivot in accordance with vertical movement of the rotating shaft, and a second link connected to the other end of the first link while being pivotably mounted to the outer surface of the guide member, and provided with a slot to receive a protrusion formed at a rear portion of an outer surface of the shelf, so as to vertically move the rear half portion of the shelf while pivoting in accordance with pivotal movement of the first link.

The first link may be provided, at an intermediate portion thereof, with a pivot shaft hole, to be mounted to a pivot shaft protruding from the outer surface of the guide member. The second link may be provided, at an intermediate portion thereof, with a pivot shaft hole, to be mounted to another pivot shaft protruding from the outer surface of the guide member.

Each of the guide members may further include a second guide hole formed to be vertically elongate so as to receive a protrusion protruding from a rear portion of an outer surface of the shelf. The second guide hole may guide the protrusion such that the protrusion moves only in upward and downward directions.

Each of the first and second links may be provided with a guide groove spaced apart from the pivot shaft hole thereof while having an arch shape, to receive a guide protrusion protruding from the outer surface of the guide member so as to guide pivotal movement of a corresponding one of the first and second links.

The first link may be provided, at the other end thereof, with a pivot shaft protruding laterally. The second link may be provided, at one end thereof, with a slot to receive the pivot shaft such that the pivot shaft is movable in a longitudinal direction of the second link.

The connecting device may include a first link pivotably mounted to the outer surface of each of the guide members and arranged to allow one end thereof to be upwardly pushed by the rotating shaft, while being formed with a gear around a pivot shaft provided at the other end of the first link, to pivot the first link in accordance with upward movement of the rotating shaft, and a second link formed with a gear around a pivot shaft provided at one end of the second link such that the gear of the second link engages with the gear of the first link, and arranged to upwardly push a protrusion formed at a rear portion of an outer surface of the shelf by the other end of the second link.

The first link may be provided with a pivot shaft hole at a center of the gear formed at the other end of the first link, to be mounted to a first pivot shaft protruding from the outer surface of the guide member. The second link is provided with a pivot shaft hole at a center of the gear formed at the one end of the second link, to be mounted to a second pivot shaft protruding from the outer surface of the guide member.

The guide member may further include a second guide hole formed to be vertically elongate, so as to receive a corresponding one of protrusions protruding from the rear portion of the outer surface of the shelf, the second guide hole guiding the corresponding protrusion, to allow the corresponding protrusion to move only in a vertical direction.

Each of the first and second links may be provided with a guide groove spaced apart from the pivot shaft hole thereof while having an arch shape, to receive a guide protrusion protruding from the outer surface of the guide member so as to guide pivotal movement of a corresponding one of the first and second links.

In another aspect of the present disclosure, a refrigerator includes a cabinet provided with a storage chamber, and a shelf assembly provided at the storage chamber, wherein the shelf assembly includes a pair of guides respectively mounted to opposite inner side walls of the storage chamber, rotating members rotatably connected to the guides, respectively, and a shelf rotatably connected to the rotating members, to be vertically movable, wherein each of the guides includes a rotating gear to rotate in link with a corresponding one of the rotating members, a rack gear linked to the rotating gear, and a body to support the rotating gear and the rack gear, wherein each of the rotating members includes rotating members respectively provided at front and rear sides, the rotating gear includes rotating gears respectively provided at front and rear sides, the rack gear includes rack gears respectively provided at front and rear sides, and the guide further includes a linkage to link the front rack gear and the rear rack gear.

Each of the rotating members may include a first rotating shaft fixed to the rotating gear of the corresponding guide, a rotating bar connected to the first rotating shaft, and a second rotating shaft connected, at one side thereof, to the rotating bar, and connected, at the other side thereof, to the shelf.

The refrigerator may further include a coupler provided at the shelf, to allow the second rotating shaft to be rotatably connected thereto.

The front rotating gear and the rear rotating gear may be engaged with the linkage, to rotate at the same angular velocity.

The guide may further include a protrusion provided at the body. The linkage may include a guide groove guided by the protrusion.

The guide groove may have a length determined such that the rotating gear has a rotating angle ranging from 0° to an angle exceeding 180°, but not exceeding 190°.

The shelf may be positioned at a lowest point when the linkage moves to a rearmost point.

When the linkage moves forwards, the rotating gear may exhibit a maximum rotation angle ranging between 180° and 190°.

The guide may include an engagement portion protruding from an outer surface of the body. The rotating gear may include a hook provided at a circumferential surface of the rotating gear, to engage with the engagement portion.

The hook may include a protrusion provided at an inner surface of the hook, to lock the engagement portion.

The engagement portion may be engaged with the hook when a rotation angle of the rotating bar exceeds 180°, but does not exceed 190°.

The hook and the protrusion may be made of an elastic material.

The circumferential surface of the rotating gear may include a first circumferential surface engaging with the rack gear, and a second circumferential surface remaining from the circumferential surface of the rotating gear, except for the first circumferential surface. No tooth may be provided at the second circumferential surface.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
   a cabinet having a storage chamber therein;
   a pair of guide members respectively mounted to opposite sides of the storage chamber, each of the guide members including a guide hole at a side wall of the guide member, and a guide groove at an inner surface of the guide member, wherein the guide hole to be vertically elongate, and the guide groove to be vertically elongate;
   a shelf mounted at the guide members, the shelf to be vertically movable;

a pair of switch members respectively mounted at opposite sides of the shelf, to be movable in a forward direction and a rearward direction, each of the switch members including a body, and a protrusion protruding from an outer surface of the body, each protrusion to be guided along the guide groove of a corresponding one of the guide members;

a rotating shaft rotatably mounted beneath the shelf, the rotating shaft to be guided along the guide holes of the guide members;

pinions respectively provided at opposite ends of the rotating shaft, the pinions to rotate with the rotating shaft;

rack gears vertically mounted at outer surfaces of the guide members, the rack gears to be coupled to the pinions, respectively; and a connecting device to provide a force to vertically move a front half portion of the shelf to a rear half portion of the shelf such that the shelf is vertically movable while being maintained in a horizontal state.

2. The refrigerator according to claim 1, wherein the guide groove includes a vertical portion at an inner surface of the guide member, and a horizontal portion at an upper end of the vertical portion, the horizontal portion to extend horizontally.

3. The refrigerator according to claim 2, wherein:
the body of each of the switch members is elongate in the forward direction and the rearward direction; and
the connecting device includes:
  a second protrusion laterally protruding from a rear portion of an outer surface of the body in each of the switch members, and
  a second guide groove at a rear portion of the inner surface of the guide member corresponding to the switch member.

4. The refrigerator according to claim 3, further comprising:
guide brackets respectively coupled to lower surfaces of opposite ends of the shelf, the guide brackets to support the switch members such that the switch members are slidable in forward and rearward directions.

5. The refrigerator according to claim 1, further comprising:
elastic members each mounted between a front surface of a corresponding one of the switch members and an inner surface of the shelf, the elastic members to provide a restoring force to push the corresponding switch member in a rearward direction.

6. The refrigerator according to claim 3, wherein:
the shelf includes two pairs of rotating shaft mounting portions at lower surfaces of opposite ends of the shelf, to receive the rotating shaft and to support the rotating shaft;
the rotating shaft includes two rotating shafts to be inserted into the two pairs of the rotating shaft mounting portions so as to be supported by the two pairs of the rotating shaft mounting portions, respectively;
the pinions include two pairs of pinions respectively coupled to opposite ends of the two rotating shafts; and
the rack gears include two pairs of racks coupled to the two pairs of pinions, respectively.

7. The refrigerator according to claim 1, wherein:
each of the guide members further includes a guide rib provided at the guide member, the guide member to be vertically elongate; and
the shelf includes guide protrusions formed at opposite sides of a rear end of the shelf, the guide protrusions to enclose the guide ribs of the guide members, respectively, the guide protrusions being slidable with respect to the guide ribs, respectively.

8. The refrigerator according to claim 2, wherein the connecting device comprises:
a first link pivotably mounted to the outer surface of each of the guide members and formed with a slot at a first end of the first link, to receive the rotating shaft so as to pivot in accordance with vertical movement of the rotating shaft; and
a second link connected to a second end of the first link while being pivotably mounted to the outer surface of the guide member, and the second link provided with a slot to receive a protrusion formed at a rear portion of an outer surface of the shelf so as to vertically move the rear half portion of the shelf while pivoting in accordance with pivotal movement of the first link.

9. The refrigerator according to claim 8, wherein:
the first link includes a pivot shaft hole, at an intermediate portion thereof, the pivot shaft hole to be at a pivot shaft protruding from the outer surface of the guide member; and
the second link includes a pivot shaft hole at an intermediate portion thereof, the pivot shaft hole to be mounted to another pivot shaft protruding from the outer surface of the guide member.

10. The refrigerator according to claim 9, wherein each of the guide members includes a second guide hole to be vertically elongate so as to receive a protrusion protruding from a rear portion of an outer surface of the shelf, the second guide hole to guide the protrusion such that the protrusion moves only in upward and downward directions.

11. The refrigerator according to claim 10, wherein each of the first and second links includes a guide groove spaced apart from the pivot shaft hole thereof while having an arch shape, the guide groove to receive a guide protrusion protruding from the outer surface of the guide member so as to guide pivotal movement of a corresponding one of the first and second links.

12. The refrigerator according to claim 8, wherein:
the first link includes a pivot shaft at the second end of the first link, the pivot shaft to laterally protrude; and
the second link includes a slot at a first end of the second link, the slot to receive the pivot shaft such that the pivot shaft is movable in a longitudinal direction of the second link.

13. The refrigerator according to claim 2, wherein the connecting device comprises:
a first link pivotably mounted to the outer surface of each of the guide members and arranged to allow a first end to be upwardly pushed by the rotating shaft, while being formed with a gear around a pivot shaft at the second end of the first link, to pivot the first link based on upward movement of the rotating shaft; and
a second link formed with a gear around a pivot shaft provided at a first end of the second link such that the gear of the second link engages with the gear of the first link, and the second link is to upwardly push a protrusion formed at a rear portion of an outer surface of the shelf by a second end of the second link.

14. The refrigerator according to claim 13, wherein:
the first link includes a pivot shaft hole at a center of the gear formed at the second end of the first link, to be mounted to a first pivot shaft protruding from the outer surface of the guide member, and
the second link includes a pivot shaft hole at a center of the gear formed at the second end of the second link, to be mounted to a second pivot shaft protruding from the outer surface of the guide member.

15. The refrigerator according to claim 14, wherein the guide member further includes a second guide hole formed to be vertically elongate, the second guide hole to receive a corresponding one of protrusions protruding from the rear portion of the outer surface of the shelf, the second guide hole to guide the corresponding protrusion, and to allow the corresponding protrusion to move only in a vertical direction.

16. The refrigerator according to claim 15, wherein each of the first and second links includes a guide groove spaced apart from the pivot shaft hole thereof while having an arch shape, the second groove to receive a guide protrusion protruding from the outer surface of the guide member so as to guide pivotal movement of a corresponding one of the first and second links.

* * * * *